United States Patent
Borkiewicz et al.

(10) Patent No.: US 8,663,723 B2
(45) Date of Patent: Mar. 4, 2014

(54) METHOD FOR AUTOMATED LOADING OF FOOD ARTICLES INTO CONTAINERS

(71) Applicants: Zbigniew Stanislaw Borkiewicz, Sun Prairie, WI (US); Brian W. Tomac, DePere, WI (US); Chuck A. Sample, Suamico, WI (US); David J. Nonn, Luxemburg, WI (US)

(72) Inventors: Zbigniew Stanislaw Borkiewicz, Sun Prairie, WI (US); Brian W. Tomac, DePere, WI (US); Chuck A. Sample, Suamico, WI (US); David J. Nonn, Luxemburg, WI (US)

(73) Assignee: Kraft Foods Group Brands LLC, Northfield, IL (US)

( * ) Notice: Subject to any disclaimer, the term of this patent is extended or adjusted under 35 U.S.C. 154(b) by 0 days.

(21) Appl. No.: 13/737,346

(22) Filed: Jan. 9, 2013

(65) Prior Publication Data

US 2013/0177684 A1 Jul. 11, 2013

Related U.S. Application Data

(60) Provisional application No. 61/584,597, filed on Jan. 9, 2012.

(51) Int. Cl.
*A23L 1/218* (2006.01)
*B65B 5/10* (2006.01)

(52) U.S. Cl.
USPC ............... 426/397; 53/236; 53/515; 53/247; 53/255

(58) Field of Classification Search
USPC ............ 426/397, 518; 53/236, 515, 247, 255
See application file for complete search history.

(56) References Cited

U.S. PATENT DOCUMENTS

| | | | | |
|---|---|---|---|---|
| 2,147,818 A | * | 2/1939 | Lang | 53/258 |
| 3,461,646 A | * | 8/1969 | Hawk et al. | 53/515 |
| 3,662,518 A | * | 5/1972 | Eisenberg | 53/515 |
| 4,539,879 A | * | 9/1985 | Egee | 83/107 |
| 4,646,509 A | * | 3/1987 | Tribert | 53/446 |
| 5,121,591 A | * | 6/1992 | Backus et al. | 53/515 |
| 6,041,577 A | * | 3/2000 | Walz et al. | 53/515 |
| 6,079,191 A | * | 6/2000 | Borkiewicz et al. | 53/515 |

FOREIGN PATENT DOCUMENTS

EP 449378 * 10/1991

* cited by examiner

*Primary Examiner* — Anthony Weier
(74) *Attorney, Agent, or Firm* — Fitch, Even, Tabin & Flannery LLP

(57) ABSTRACT

The illustrative method and apparatus provides a more efficient system for automated slicing and loading of food articles into containers. The apparatus includes at least one cutting assembly and at least two chutes and depositing assemblies. The apparatus may include a positioning receptacle that aligns the food articles with a knife set and a driving arm that advances the food article into engagement with the knife set. The chutes may include a movable chute portion, which moves from alignment with the knife set to alignment with the containers, and a chute extension. Openings for the sliced food sections, which extend through the movable chute portion and the chute extension, have a cross section that changes to rotate the orientation of the food sections passing therethrough. Once deposited into the containers, the food sections are oriented with at least some cut faces of the food article adjacent the container wall.

17 Claims, 26 Drawing Sheets

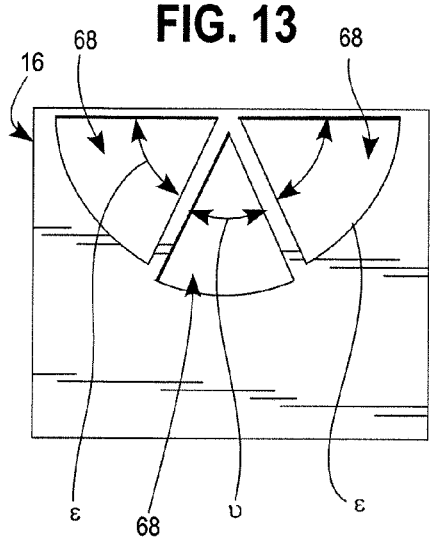
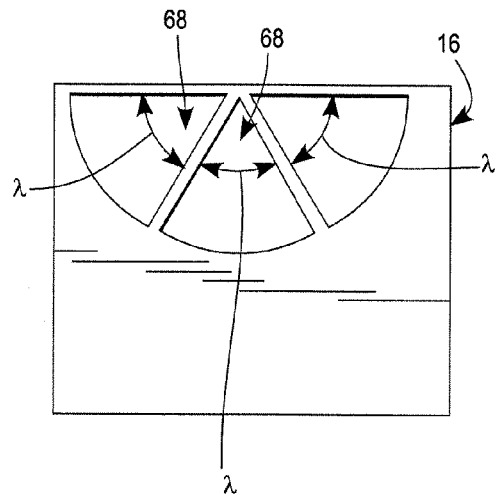
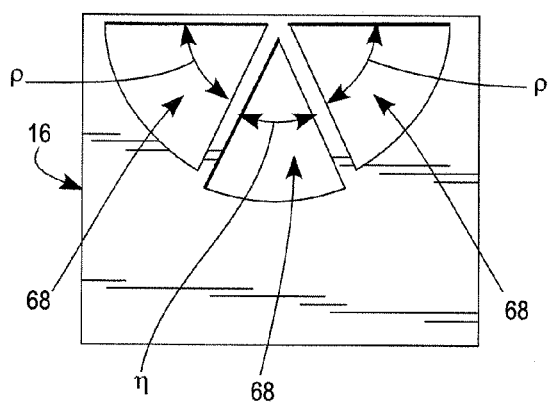
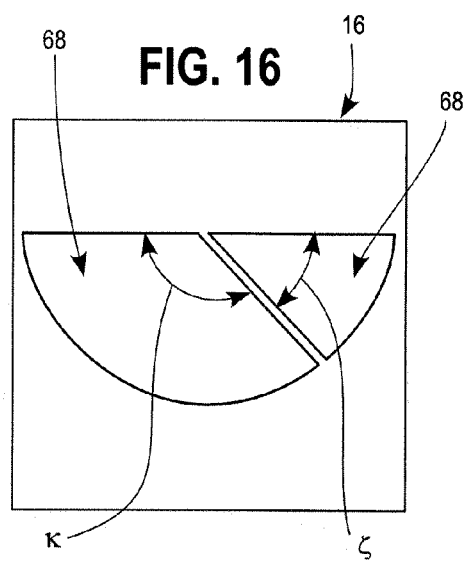

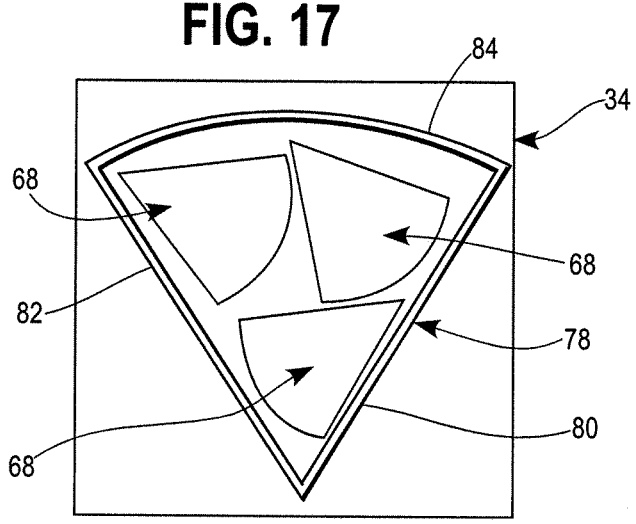
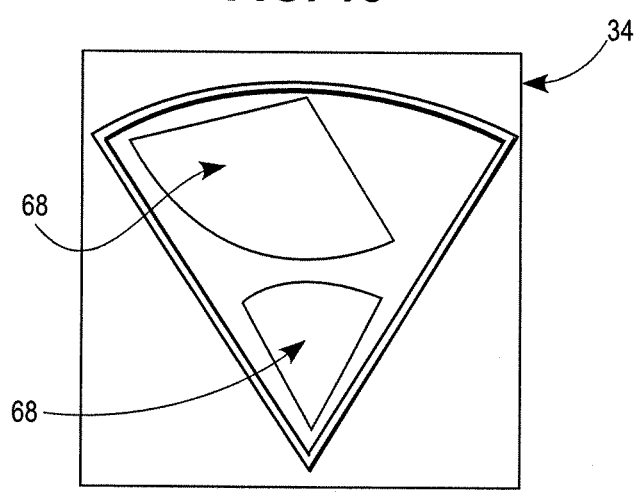

METHOD FOR AUTOMATED LOADING OF FOOD ARTICLES INTO CONTAINERS

This application claims the benefit of U.S. Provisional Application No. 61/584,597, filed Jan. 9, 2012, which is incorporated herein by reference in its entirety.

TECHNICAL FIELD

The invention relates generally to slicing and loading of food articles, and more particularly, to halves, slices, and spears of food articles such as cucumbers or pickles.

BACKGROUND

Packaging food articles in clear containers enables consumers to visually inspect the food articles prior to purchasing. The placement of such food articles within the clear container also may provide consumers with the ability to further assess the quality of the food articles contained therein. For some food articles, such as cucumbers, consumers may prefer to see the pulp of the cucumber (as opposed to the skin) to help evaluate the quality of the food articles. Thus, consumers find it desirable to have the cut face or pulp of the food articles disposed adjacent to the outside wall of the containers.

The ten "pickles" is used herein to refer to cucumbers or portions thereof that are packaged in brine with spices such as, for example, garlic, dill and/or other spices or flavorings. In addition to pickled cucumbers, the discussion herein also may apply to other pickled foods such as a variety of pickled vegetables.

A great deal of precision is required to provide a desired quantity of cucumber and brine in an appropriate ratio, and with the cucumber slices or spears in the desired orientation and configuration. Prior art methods of packing cucumber sections such as slices and spears into jars often involve using automated equipment to load the sections around the periphery of the jar with pulp surfaces rather than skin primarily visible through the side wall of the jar, and then manually inserting additional cucumber sections into the center of the jar. During packing, one of the problems that must be addressed is maintaining the food sections in alignment with one another, as the outer sections (those disposed along the container wall) may tend to collapse inward, prior to packing of the inner sections. Another problem is to provide a desired quantity of sections in each jar, while dealing with cucumber sections that are not all of the same size and shape. While the cucumbers may be sorted so that all cucumbers for particular sizes of jars are within certain ranges, some variation inevitably occurs, both as to size and as to shape. For example, some cucumbers are asymmetrical, and might be described as somewhat banana-shaped.

Pickle sections are typically sized so that their lengths are close to the vertical dimension of the jar in which they are packaged, and the outer pickle sections are often positioned with their upper ends contacting a shoulder of the jar. The cucumbers may be trimmed to predetermined lengths prior to longitudinal slicing. For example, an end of each cucumber may be sliced off prior to sectioning so that when loaded into the jar, each section has a flat top.

The above-described methods and apparatus for producing pickles, and for slicing or sectioning food products and placing them into containers, are not entirely satisfactory.

SUMMARY

The illustrative apparatus described herein provides a more efficient system for automated slicing and loading of food articles into containers and includes at least a cutting assembly, two chutes, and a depositing assembly. The illustrative apparatus also may include a positioning receptacle that receives and aligns cucumbers with a knife set and a driving arm that advances the cucumbers through a centering device and into engagement with the knife set thereby creating cucumber sections. The chutes may include first and second movable chutes that are movable from a first position aligned with the knife set and a second position aligned with one of the plurality of containers. The first and second movable chutes have openings therein for each of the cucumber sections.

The openings in the movable chutes are configured to rotate the cucumber sections as they are advanced from the entrance to the exit of the movable chutes. By rotating the cucumber sections, the movable chutes orient the cucumber sections such that the cut faces of the cucumber sections will be arranged adjacent the container wall once the cucumber sections are deposited into the containers. More particularly, the openings have a cross section that rotates the cucumber section so that at least a portion of the cut face of the cucumber section is adjacent the wall of the container. When the movable chutes are in the second position (aligned with one of the plurality of containers), a driving mechanism is activated to advance the cucumber sections through the movable chutes and into the containers. The illustrative apparatus also includes a first and a second divider (which have radially disposed divider wings) that may be disposed in an interior of the container to form a plurality of compartments. Each of the compartments may be filled with one half of a cucumber. One half of a single cucumber is deposited into an unfilled compartment of a first container and the other half of the cucumber is deposited into an unfilled compartment of a second container.

The illustrative apparatus also may include a containment mechanism, which may comprise stripper blades positionable at the container opening subsequent to depositing the cucumber sections within the container. The containment mechanism may have slots therein to permit removal of the divider from the interior of the container without permitting withdrawal of the cucumber sections from the interior.

The illustrative method provided herein provides a manner of loading cucumber sections or portions into containers in a completely automated manner such that the jar will be filled with cucumber sections without requiring any manual filling of the container with cucumber sections. The cucumber sections may include, for example, slices, spears, and halves. The illustrative process includes positioning a cucumber into a positioning receptacle and advancing the cucumber through a centering mechanism and into engagement with at least one cutting element or knife to produce cucumber sections. Half of the cucumber sections are advanced into a first chute and the other half of the cucumber sections are advanced into the second chute. The first and second chutes are moved from a first position adjacent to or in alignment with the knife to second position that is adjacent to or in alignment with the containers.

The illustrative method also provides for depositing first and second dividers into the interior of the containers prior to receive the cucumber sections, such as by raising the containers upward. The dividers may portion the inside of the container into compartments. Once the dividers are positioned in the container, an open, unfilled compartment of the first and second divider is aligned with an exit of the first and second chutes. The cucumber sections are advanced from the first and second chutes into the containers and into the unfilled divider compartment. As the cucumber sections are advancing through the first and second chutes, the cucumber sections twist or rotate within the first and second chutes. By rotating the cucumber sections as they are advanced through the first and second chutes, a portion of the cucumbers sections are deposited in the container such that the cut face portion (having exposed pulp) will be disposed adjacent the wall of the container. Once the divider compartment aligned with the chute exit has been filled, the containers with the first and second dividers are rotated to align another unfilled divider compartment with the exit of the first and second chutes. The dividers retain the cucumber sections deposited in the container in their desired positions during subsequent filling operations. More particularly, if the divider creates five compartments in the container, the cucumber sections deposited into the first compartment will remain in their desired arrangement as the subsequent compartments are filled with cucumber sections. The method further includes positioning additional cucumbers into the positioning receptacle and advancing them through the centering mechanism and into engagement with the knife until the first and second containers are filled with the cucumber sections.

Once the first and second containers are filled with cucumbers such that each compartment of the first and second dividers has been filled, the illustrative method positions a set of first and second stripper blades at openings of the first and second containers. After positioning the stripper blades at or above the container openings, the first and second dividers are removed from the containers through openings or slots in the stripper blades.

So configured, the illustrative apparatus and method provide automated and high-speed cutting and loading of food articles into containers in a predetermined configuration such that the entire container cavity or interior may be filled without requiring manual insertion of the food articles into the containers. Further, the illustrative apparatus and method provide increased speed and efficiency in the cutting and loading of the food articles into containers.

BRIEF DESCRIPTION OF THE DRAWINGS

FIGS. 13, 14, 15, and 16 are top views of differently configured movable chutes;
FIGS. 17 to 18 are bottom views of differently configured twist chutes.

Elements in the figures are illustrated for simplicity and clarity and have not necessarily been drawn to scale. In addition, certain elements that are useful or necessary in a commercially feasible embodiment are sometimes not depicted to facilitate a less obstructed view of the various embodiments.

DETAILED DESCRIPTION

Figure 1:
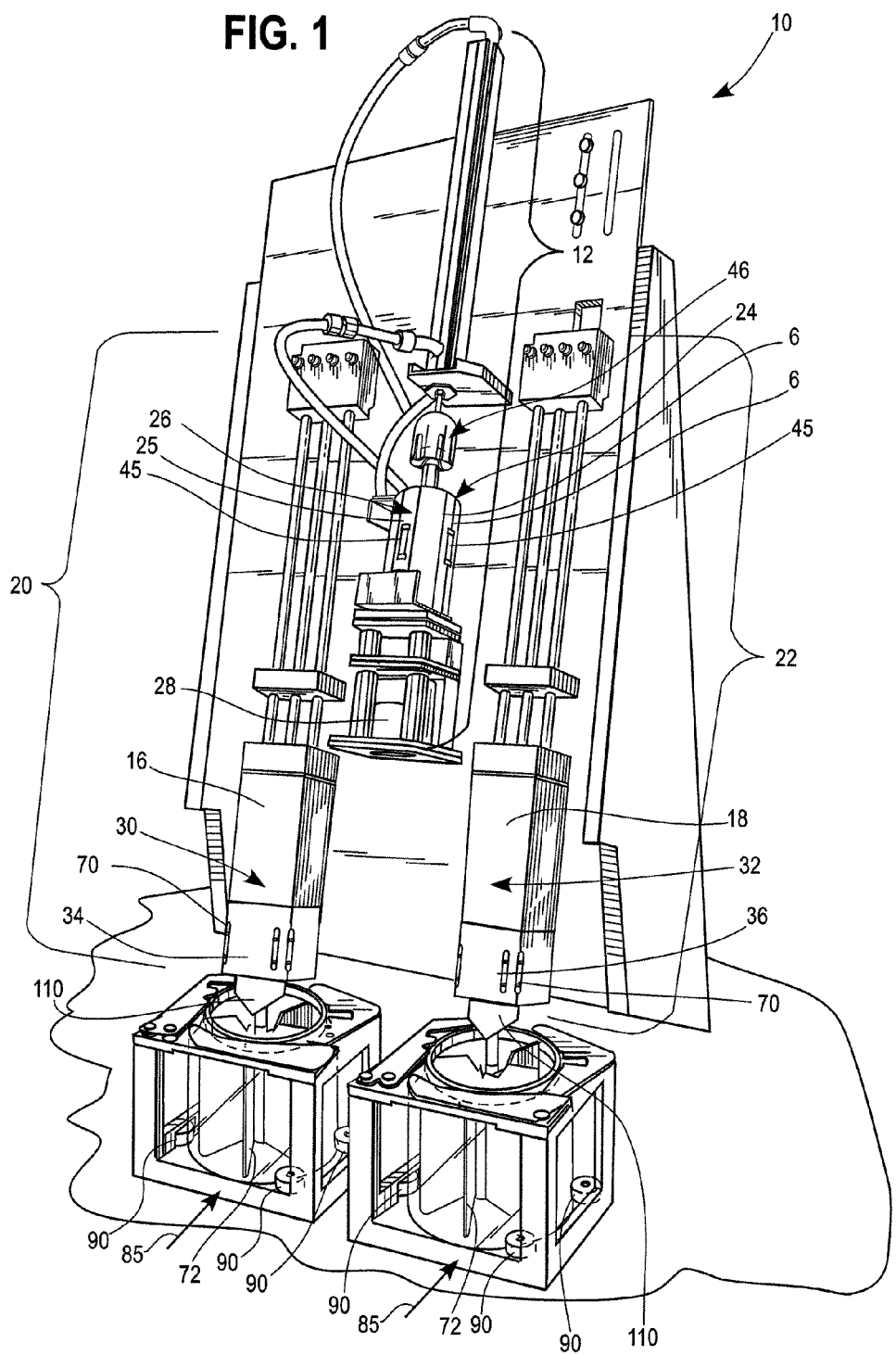
FIG. 1 is a partial schematic view of an embodiment of the invention.

Referring to FIG. 1, an illustrative cutting and depositing module or apparatus 10 has a cutting assembly 12 and two depositing assemblies 20, 22 associated therewith. The module or apparatus 10 also includes first and second movable chutes 16, 18 that move from alignment with the cutting assembly 12 (see, e.g., FIG. 11) to alignment with a respective one of the two depositing assemblies 20, 22 (see, e.g., FIG. 12). The food articles are moved from alignment with the cutting assembly 12 to alignment with the depositing assemblies 20, 22 via the movable chutes 16, 18. By one approach, the food articles may include vegetables, such as, for example, cucumbers, which may be cut and deposited into containers that are subsequently filled with brine to produce pickles. The cutting assembly 12 is employed to portion or cut the food article into sections or portions. The depositing assemblies 20, 22 are employed to deposit the food sections into containers, such as, for example, clear jars.

During operation, the cutting and depositing apparatus 10 may be operated with numerous other cutting and depositing apparatus 10. For example, in a single packing operation there may be four to twelve cutting and depositing apparatus or modules, each having a cutting and depositing apparatus 10. In one configuration, ten modules or apparatus 10 are employed online in a packing operation. With ten modules or apparatus 10, each loading two jars at a time, the high-speed of the packing operation may produce between 60 and 160 filled containers per one minute. In one example, approximately 100 containers are filled in about one minute.

A food article or cucumber delivery apparatus and a container or jar handling apparatus may be connected to each of the cutting and depositing apparatus 10 when installed. For example, a cucumber delivery apparatus may be configured to continuously provide cucumbers to each of the cutting and depositing apparatus 10 and the container delivery apparatus may be configured to feed the containers to the cutting and depositing apparatus 10 and to advance the containers from the apparatus 10 to subsequent operational stations such as, for example, the brine filling and container sealing stations. In one illustrative example, the cucumber delivery apparatus and the container handling section may be similar to those described in U.S. Pat. No. 6,079,191, which is hereby incorporated herein in its entirety. In some installed configurations, a plurality of delivery apparatus and container handling apparatus may be employed.

Figure 2:
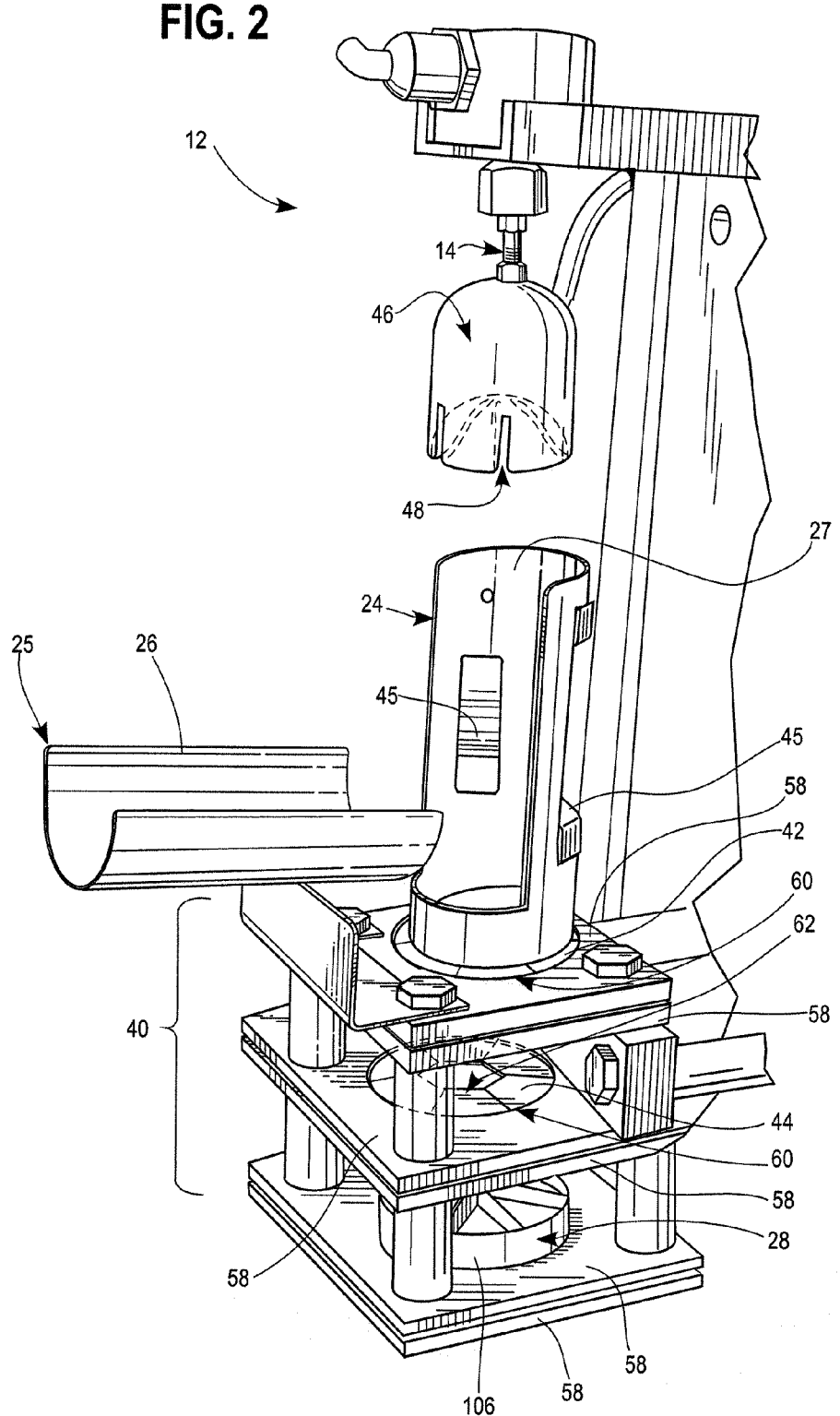
FIG. 2 is a partial schematic view of a portion of the embodiment of FIG. 1.

As seen in FIG. 2, the cutting assembly 12 includes a positioning receptacle 24 that has an alignment mechanism 25. During operation, the alignment mechanism 25 moves from a first position, where the cucumber is received from a cucumber delivery apparatus, to a second position, where the cucumber is aligned with a driving arm 14. In one embodiment, the alignment mechanism 25 may include a tip up mechanism or chute 26 that moves the cucumber from a lowered, generally horizontal position to a raised, generally vertical position. The generally circular cross section of the cucumber fits within the generally arcuate cross-sectional shape of the tip up mechanism 26 and the cucumber moves with from a lowered position to an upright position with the tip up mechanism 26. In operation, the cutting and depositing apparatus 10 may be disposed generally vertical such that the axis of the cutting and depositing apparatus 10 is between about 70° to about 110° from the horizon. In one configuration, the cutting and depositing apparatus 10 is about 75° from the horizon.

The positioning receptacle 24 has a generally cylindrical side wall and may have a plurality of braking and centering members 45 that extend from the sidewall toward the inside or center of the positioning receptacle 24. The centering members 45 function to prevent the cucumbers from falling into the cutting frame 40 prior to being advanced by the driving arm 14. This may be particularly helpful when processing relatively smaller cucumbers. Further, the centering members 45 may be disposed on the tip up mechanism 26 and the housing wall 27. In another configuration, the centering members 45 are disposed on the positioning receptacle 24 at a position below the tip up mechanism 26 and the housing wall 27 adjacent thereto. The centering members 45 may be spring-loaded and they may operate to center the cucumber within the circumference of the positioning receptacle 24. The positioning receptacle 24 positions the cucumber adjacent to and in alignment with cutting elements 28, which are retained in a cutting frame 40 (discussed further below).

Figure 4:
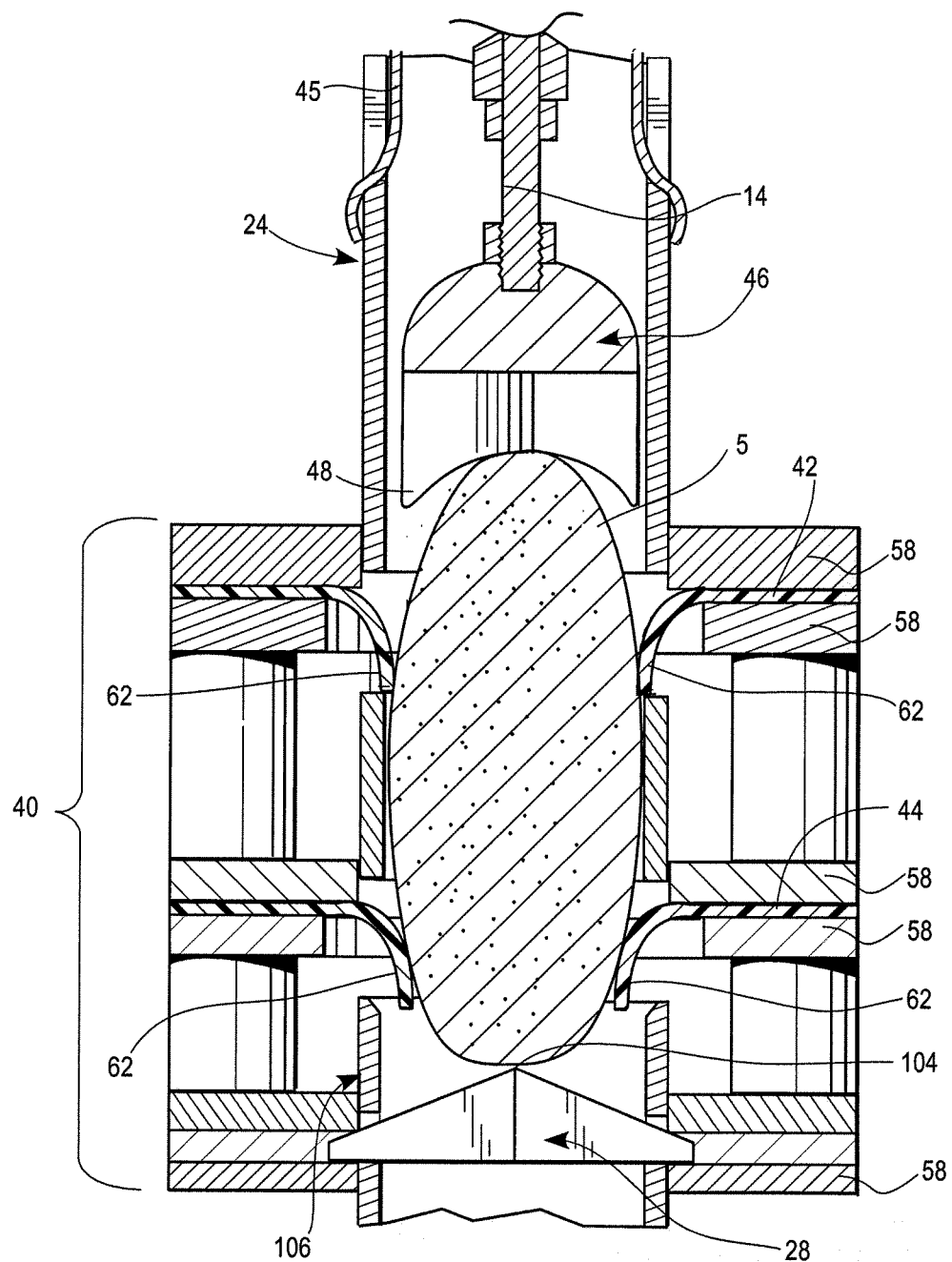
FIG. 4 is a cross section of a cutting assembly.

Once the alignment mechanism has moved the cucumber to the second position (in alignment with the cutting elements 28), the cutting assembly 12 engages a driving arm 14, which may push the cucumber through the cutting elements 28 along the length of the cucumber (see, e.g., FIG. 4). The driving arm 14 moves toward the cutting elements 28 and advances the cucumber into engagement therewith.

By one approach, the driving arm 14 may include a pusher face or a concave engagement member 46 disposed on the end of the driving arm 14 that directly contacts the cucumber. In one embodiment, the concave engagement member 46 has a curved or cup-shaped face that generally follows the generally rounded end of a cucumber. The curved face of the concave engagement member 46 may help retain the cucumber in position during the cutting operation such that the lengthwise dimension of the cucumber 5 is retained generally parallel with the direction of the movement of the driving arm 14 (see FIG. 4). To that end, the centering members 45, 145 and flexible membranes 42, 44 (described below) also may be employed to ensure proper positioning of the cucumber 5 during the cutting operation, which helps produce uniformly shaped cucumber portions.

In one illustrative embodiment, the concave engagement member 46 has slots 48 that extend into the face of the concave engagement member 46. The slots 48 are configured to receive at least a portion of the cutting elements 28 thereby permitting the concave engagement member 46 to extend at least partially in between portions of the cutting element 28. In this manner, the cucumber is pushed through the cutting elements 28 by the concave engagement members 46, which are configured to help prevent the cucumber and cucumber portions from getting stuck in the cutting elements 28. In operation, the slots 48 permit the concave engagement member 46 to mesh together with the cutting elements 28. In one configuration, the driving arm 14 advances downward to push the cucumber into engagement with and through cutting elements 28 disposed below the positioning receptacle 24. After the cucumber has passed through the cutting elements 28, the cucumber portions are then pushed into the first and second movable chutes 16, 18 via driving arm 14 and concave engagement member 46.

As illustrated in FIG. 2, the cutting frame 40 is aligned with the positioning receptacle 24 and the driving arm 14. The cutting frame 40 includes at least one cutting element 28 and also may include a centering membrane such as flexible membranes 42, 44 discussed below. The cutting element 28 may include a knife blade, a thin wire, or other, similar cutting elements. The cutting elements 28 may be arranged in different configurations to produce a variety of cucumber portions or sections, such as spears, slices, or halves. By one approach, the cutting element 28 may include radially disposed blades or wires and may produce cucumber spears having a cut face angle between a first and a second cut face of between about 36° to about 72°. By another approach, the cutting element 28 may include parallel portions that produce cucumber slices.

Each of the cutting element configurations illustrated in FIGS. 5-10 may be arranged to divide or separate the cucumber into about half so that each movable chute 16, 18 receives about one half of the cucumber being cut. For example, in FIG. 5, a first half of the cucumber will include four spears and a second half of the cucumber will include the other four spears. Thus, the first movable chute 16, which is configured to receive half of the cucumber, will receive four spears from the cutting assembly 12 and the second movable chute 18, also is configured to receive half of the cucumber, will receive another four spears from the cutting assembly 12. These two halves are then deposited into their respective containers, as discussed below.

Figure 3:
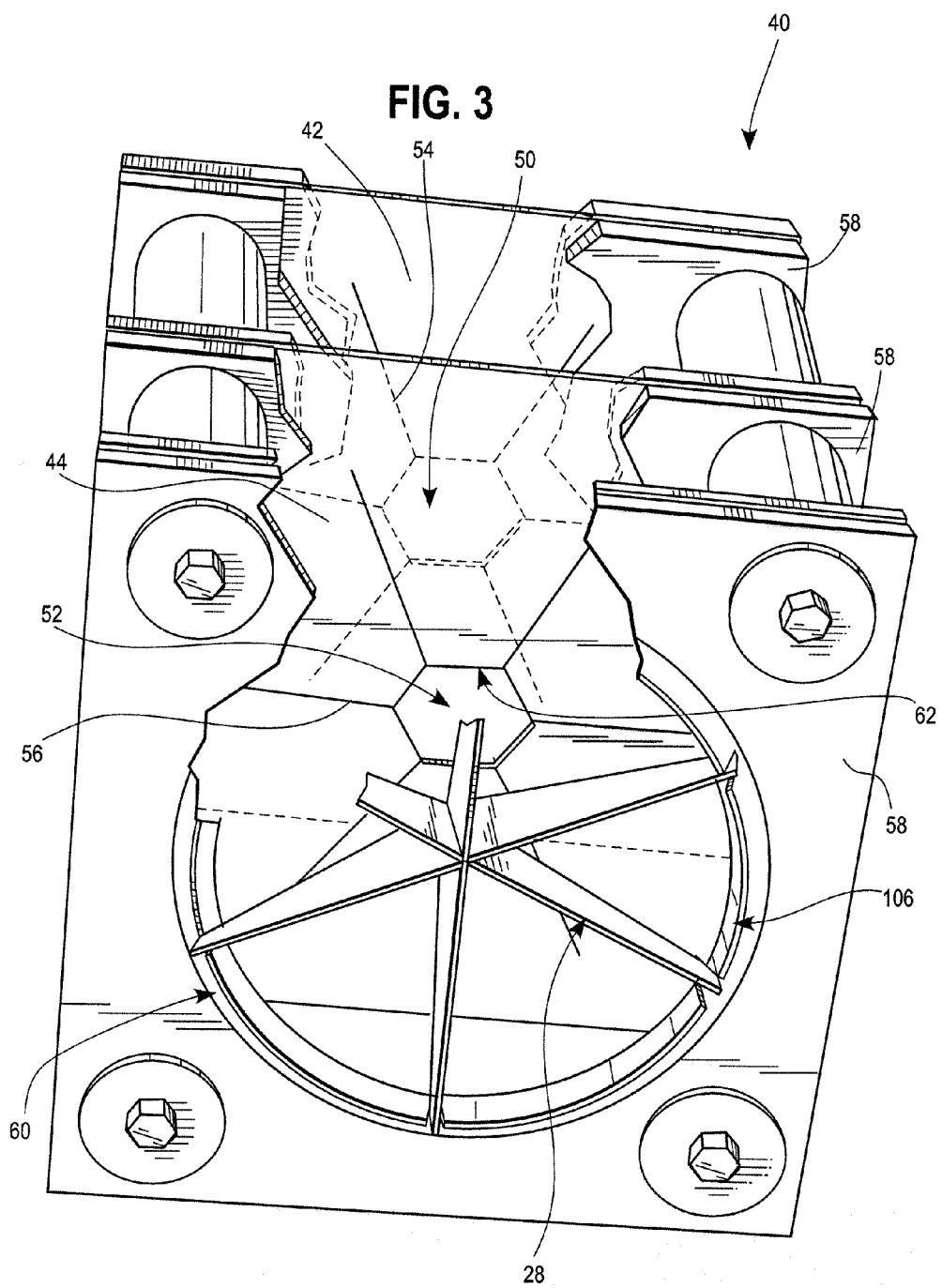
FIG. 3 is detailed bottom perspective view of a portion of FIG. 1 with a portion removed.
Figure 5:
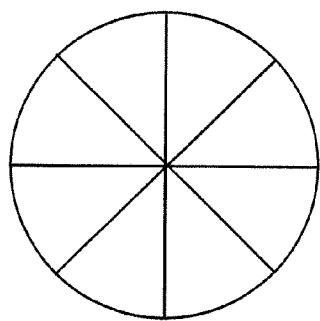
FIGS. 5, 6, 7, 8, 9, and 10 are schematic views of alternative configurations of portions of the cutting element.
Figure 6:
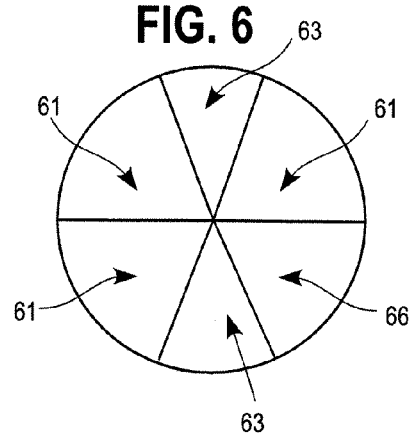

In one illustrative embodiment, the cutting elements 28 include six individual blades arranged in a radial configuration or three blades overlapping at their mid-points, as illustrated in FIGS. 3 and 6. In such a configuration, the cutting elements 28 create six cucumber portions generally having a spear shape. The cucumber spears typically have two cut faces or sides and an arcuate side that typically has the cucumber skin disposed thereon. In other configurations, such as those for slices or halves, different blade configurations will be used and when those sections are loaded into the container at least a portion of their cut faces typically remains visible through the container wall. The cutting elements 28 may be arranged to produce a set of cucumber spears with an angle between the cut faces (cut face angle) that is approximately equal (see, e.g., FIG. 5) or they may be arranged to produce cucumber spears having a variety of cut face angles (see, e.g., FIG. 6). In the example of FIG. 6, six cucumber spears are produced and four of the spears have a larger cut face angle 61 and two of the spears have smaller cut face angles 63. As discussed below, the cucumber spears are rearranged into a different configuration before being deposited into the containers. Further, the spears with the smaller cut face angles 63 are those deposited in the inner portion of the container, whereas the spears with the larger cut face angle 61 are deposited on the outside portion of the container and along the container wall. By one approach, the four larger cut face angles may be between about 62° to about 75° and the smaller cut face angles may be between about 30° to about 55°.

As noted above, each movable chute 16, 18 receives about one-half of the cucumber (whether the cucumber has been sectioned into slices, spears, or halves) and the cutting element 28 is configured to cut the cucumber into two relatively equal halves. Therefore, if the cutting element 28 is arranged to produce spears, it may be configured to divide the generally circular cucumber into two 180° portions. For example, the cut face angles for a six cucumber spear configuration may be 64°, 52°, and 64° for one half and 64°, 52°, and 64° for the other half. In another example, the cut face angles may be 66°, 48°, and 66° for each half of the cucumber. In yet another example, the larger spears have an angle of about 68° between their cut faces and the smaller spears have a cut face angle of about 44°. Alternatively, if spears of generally equal size are desired, the each of the cut face angles may be about 60°.

Figure 7:
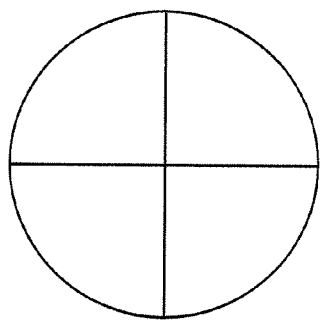
Figure 8:
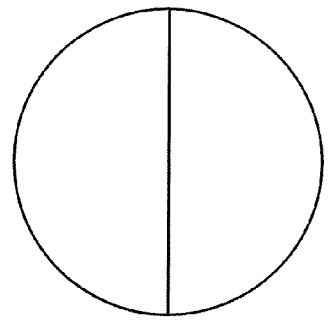
Figure 9:
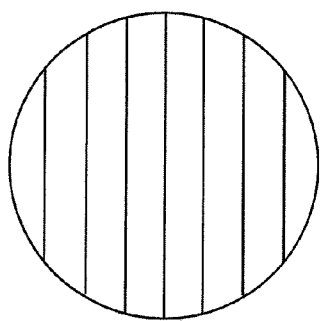
Figure 10:
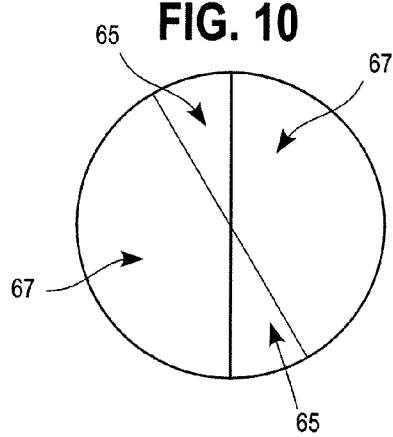

FIG. 5 also illustrates a cutting element configuration that produces spear-shaped cucumber portions, however, FIG. 5 has an additional cutting element or two (depending how the cutting element is formed). FIG. 5 produces eight cucumber portions or spears, each having a similar cross section. More particularly, the angle between the two cut faces of the spears shown is approximately 45°. FIG. 7 creates four cucumber portions or quarters and FIG. 8 creates two cucumber portions or halves. In yet another configuration, a plurality of the cutting elements 28 may be arranged in a parallel configuration to create cucumber slices. FIG. 9 illustrates how the elements may be arranged to produce eight cucumber slices. FIG. 10 illustrates how the elements may be arranged to produce four spears 65, 67 (two larger spears 67 (e.g., about 105° to about 130°) and two smaller spears 65 (e.g., about 50° to about 75°).

The cutting element 28, illustrated in FIG. 4, has an apex in the middle thereof. This extended point 104 of the cutting element 28 helps to limit friction during the cutting operation and to make the cutting process easier. More particularly, the extended point 104 helps pierce the skin of the cucumber and helps begin the cutting operation quickly such that the cucumber is retained in position generally parallel to the direction of the driving arm 14.

As shown in FIG. 3, the cutting elements 28 also are mounted onto a metal plate 58 with a large opening 60. When mounted, the center of the cutting elements 28 is aligned with the openings 50, 52 of the flexible membranes and the openings 60 of the plates 58. The metal plates 58 retaining the cutting elements 28 also may include a circular wall or housing 106 around the cutting elements 28. This circular housing 106 helps retain the cutting elements 28 in position. More particularly, the cutting elements 28 shown in FIGS. 2-3 overlap at their midpoints and the housing 106 may engage the ends of the individual cutting elements 28 to retain the desired position thereof.

The configuration of the cutting elements 28 affects the configuration of concave engagement member 46. More particularly, the slots 48 on the concave engagement member 46 may be configured to permit the cutting elements 28 to extend therein and, thus, the slots 48 will correspond to the cutting elements 28. If the cutting elements 28 are arranged in a radial or parallel configuration, the slots 48 are arranged in a respective radial or parallel to accommodate the cutting elements 28.

The cutting frame 40 also may include at least one centering membrane. By one approach, a first flexible membrane 42 is positioned a distance above a second flexible membrane 44. The distance between the flexible membranes 42, 44 may vary and may depend on the size of the cucumbers being cut and packaged. By one approach, the distance between the flexible membranes 42, 44 is between about 1 to about 3 inches. By another approach, the distance between the flexible membranes 42, 44 is about 1.5 inches. In one embodiment, the flexible membranes 42, 44 include urethane membranes having a central opening 50, 52 with a plurality of slits 54, 56 extending from the central openings 50, 52. The flexible membranes 42, 44 are sandwiched between plates 58, which have a large opening 60 therein that expose the flexible membranes 42, 44 and the slits 54, 56. The slits 54, 56 may extend through the flexible membranes 42, 44 to a point nearly adjacent the metal plates 58. In other configurations, the slits 54, 56 will terminate prior to the metal plates 58. The configuration of the slits 54, 56 may depend on the thickness of the flexible membranes 42, 44. More particularly, if the membrane is a thicker urethane membrane, then the slits 54, 56 may be longer, whereas if the flexible membrane is quite thin and highly flexible, then the slits 54, 56 may be shorter.

The slits 54, 56 in the flexible membranes 42, 44 form movable portions or tabs 62 in the membranes 42, 44 that may move downward as the cucumber passes through the central openings 50, 52. The tabs 62 of the flexible membranes 42, 44 help direct the cucumber to the center of the cutting frame 40 and also are flexible enough to accommodate the width of a variety of cucumber sizes. Thus, the flexible membranes 42, 44 operate to help align the cucumber with the cutting elements 28 so that fairly uniform cucumber sections or portions are produced when the cucumber passes over the cutting elements 28.

As suggested, to ensure generally uniform cucumber portions are created, a number of centering devices may be employed to help align and center the cucumber with the cutting elements 28 before and during the cutting operation. For example, the positioning receptacle 24 includes centering members 45 that position the cucumbers within the center of the positioning receptacle 24, which itself is centered adjacent or above the cutting elements 28. The concave engagement member 46 also helps retain the cucumber in alignment with the cutting elements 28 and parallel to the cutting operation by retaining an end of the cucumber within the concave cup portion as the driving arm is engaged (see, e.g., FIG. 4). Furthermore, the cutting frame 40 may include flexible membranes 42, 44 that help to center the cucumber as it passes through the cutting frame 40 and into engagement with the cutting elements 28. FIG. 4 illustrates a cucumber advancing through the cutting frame 40. The movable tabs 62 are illustrated being moved downward by the cucumber 5 passing through the flexible membranes 42, 44. The flexible membranes 42, 44 help center the cucumber with respect to the cutting elements 28.

The various centering devices are configured to permit the cutting and depositing assembly 10 to be used with a variety of cucumber sizes. By one approach, the cucumber circumference may be between about 3 and about 7 inches. By another approach, the cucumber circumference may be between about 4.75 to about 6.5 inches. In yet another configuration, the cucumber circumference may be between about 5 to about 6.25 inches. In one embodiment, the cucumbers may have a diameter of about 1.25 in. to about 2.5 in. By one approach, the cucumber lengths may be between about 3 in. to about 7 in., though the cucumbers lengths are typically between about 3.5 in. to about 6 in. In one illustrative embodiment, the cucumbers are around 5 in. long, or slightly shorter. In some embodiments, the cucumbers may have one or both ends cuts. In one configuration, after the cucumber lengths are trimmed, the cucumber length may be approximately 4.5 in. to about 5.0 in. In other configurations, cucumbers longer than 5.0 in. may be sliced and deposited into containers, for example, if a spiral or angled divider is used, as described below. The desired cucumber size may depend on the size of the containers into which the cucumber will be deposited.

Figure 48:
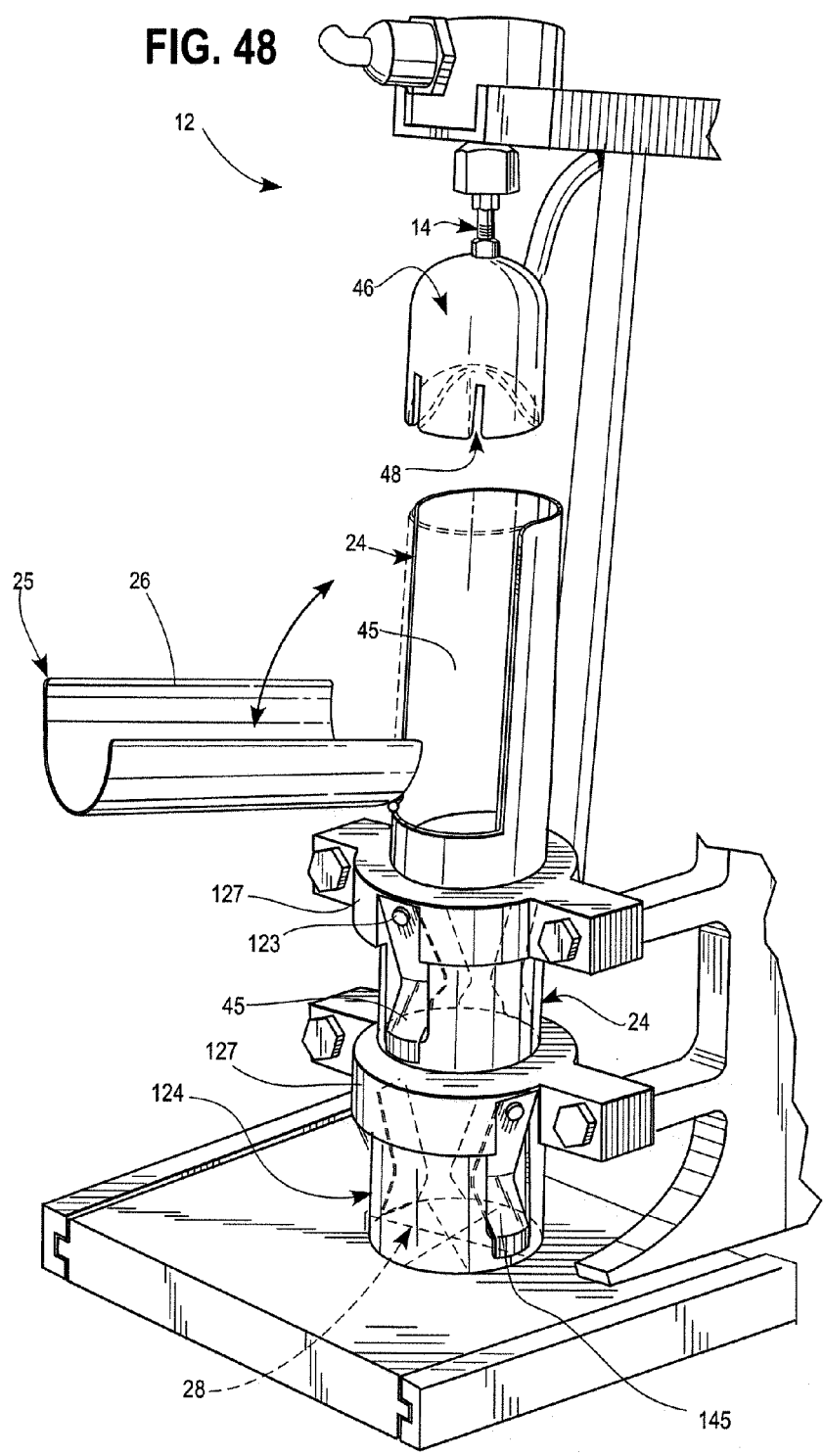
FIG. 48 is a partial schematic view of an alternative embodiment.

Another configuration of centering members 45, 145 is illustrated in FIG. 48. A second positioning receptacle 124, which is shown below and similar to positioning receptacle 24, may be incorporated into cutting assembly 12. By one approach, the second positioning receptacle 124 is positioned between the positioning receptacle 24 and the cutting elements 28, and the driving arm 14 may push the cucumbers through the positioning receptacle 124 and into engagement with the cutting elements 28. The positioning receptacle 124 may replace the flexible membranes 42, 44, or alternatively, may be used in association with the flexible membranes 42, 44.

Figure 49:
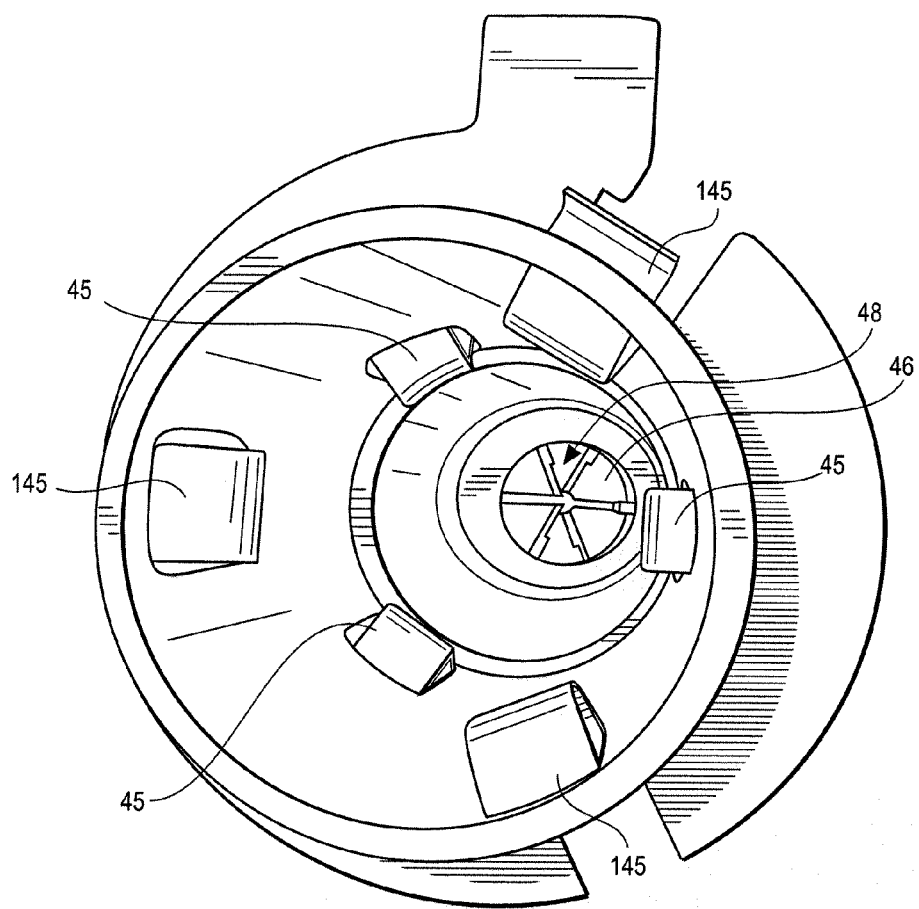
FIGS. 49 and 50 are bottom perspective view of the alternative embodiment of FIG. 48.
Figure 50:
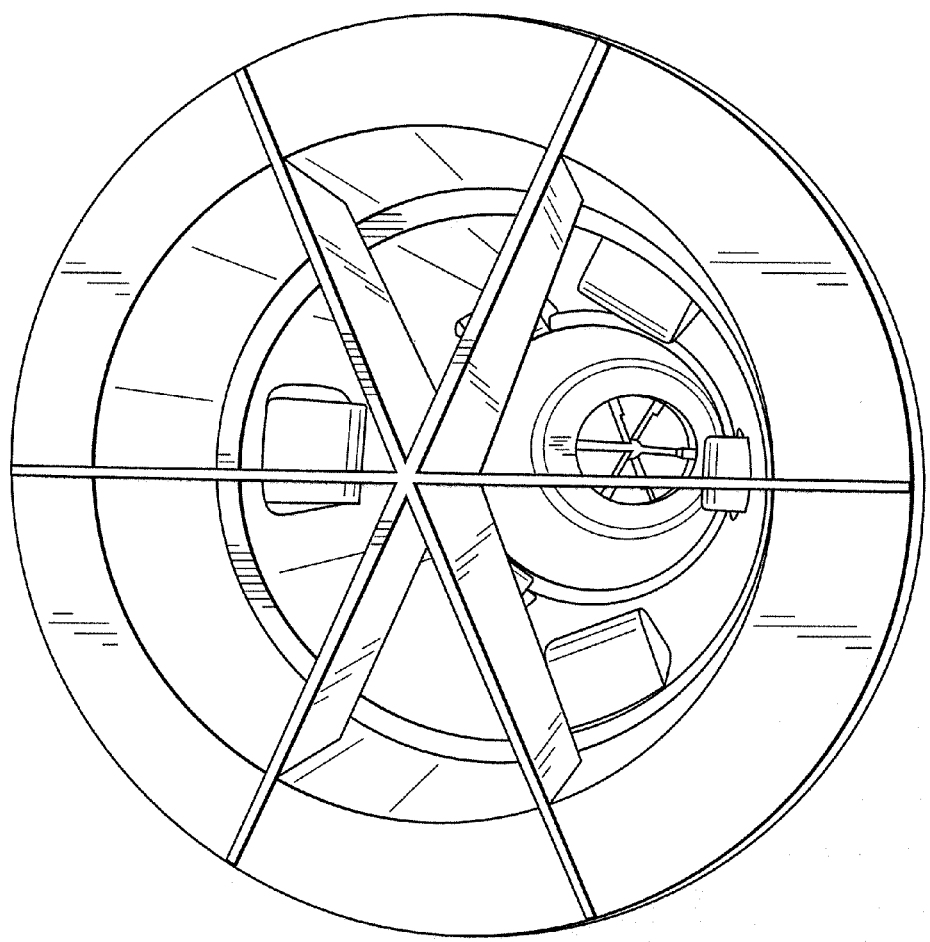

In one illustrative embodiment, the positioning receptacle 124 includes three springs or centering members 145 that extend toward the center of the positioning receptacle 124. The centering members may be disposed around the circumference of the positioning receptacle 124 such that each is disposed 120° from one another. FIG. 49 is a bottom perspective view of the inside of the second positioning receptacle 124, along with the positioning receptacle 24 disposed above the second positioning receptacle 124. As shown, the lower centering members 145 may be arranged in an offset manner from the upper centering members 45. For example, the lower centering members 145 may be disposed about 60° from the location of the upper centering members 45 along the circumference of the positioning receptacles 24, 124. FIG. 50 illustrates the bottom perspective view of the inside of the positioning receptacles 24, 124 with the cutting elements 28 in position.

In FIG. 2, the centering members 45 are incorporated into the positioning receptacle at the same height as the chute or tip up mechanism 26. It also is anticipated that the centering members 45 may be disposed at a different height than the tip up mechanism 26. For example, in FIG. 48, the tip up mechanism 26 may be disposed above the location of the first set of centering members 45. In this configuration, once the cucumbers are positioned generally upright in the tip up mechanism 26, they will descend to the centering members 45 that also may provide a braking function that prevents the cucumbers from falling into the cutting frame 40 prior to being advanced by the driving arm 14.

In one illustrative embodiment, centering members 45, 145 are comprised of a thin strip of material, such as metal, that has one or a plurality of bends therein. For example, one configuration has a v-shaped or u-shaped bend in the middle of the strip, and is configured such that the bend extends toward the interior of the positioning receptacle 24, 124. To secure the centering members 45, 145 into position one of the strip ends may be attached to the receptacle. This thin strip of material acts as a spring urging articles toward the center of the receptacles 24, 124. It is anticipated that the centering members 45, 145 will each have the same spring forces as one another such that each centering member 45, 145 pushes the cucumbers to the center of the positioning receptacles 24, 124.

By one approach, the centering members 45, 145 have one of their ends mounted to the positioning receptacles 24, 124 or to a receptacle collar 127. Further, the other end of the centering member 45, 145 may not be fastened to the receptacle 24, 124 or the collar 127. By having only one end of the centering member 45, 145 securely fastened to the positioning receptacle 24, 124 or collar 127, the centering member 45, 145 may flex outwardly from the receptacle 24, 124, and this may allow the apparatus to accommodate larger cucumbers, and thereby provide some flexibility with respect to the cucumber sizes processed. Alternatively, the centering members 45, 145 may be mounted at both ends thereof.

FIG. 48 also illustrates first and second receptacle collars 127 that have a central opening for the positioning receptacles 24, 124 to extend therethrough such that the collars 127 at least partially surround the receptacles 24, 124. The first and second receptacle collars 127 may secure or fasten the positioning receptacles 24, 124 to an apparatus frame and may mount the centering members 45, 145. By one approach, the centering members 45, 145 may be securely mounted via screws 123. To avoid having the screws 123 extend into the center opening of the positioning receptacles 24, 124 (which may interfere with passage of the cucumber or damage the cucumbers as they advance through the apparatus), the screws 123 may be drilled into and secured to the collar 127. In FIG. 48, an upper end of each of the centering members 45, 145 is fastened to the cutting assembly 12 at one of the collars 127 by a screw 123. As noted above, the lower end of the centering member 45, 145 may not be fastened to the receptacle 24, 124 or collar 127.

In FIGS. 2 and 48, three centering members 45, 145 are illustrated around the circumference of the positioning receptacles 24, 124. In other configurations, more than three centering members 45, 145 may be disposed around the circumference of the receptacles 24, 124. For example, four, five, six, or more, centering members 45, 145 may be used around the positioning receptacle 24, 124 to position, center, and brake the cucumbers as they advance through the cutting assembly 12.

Figure 11:
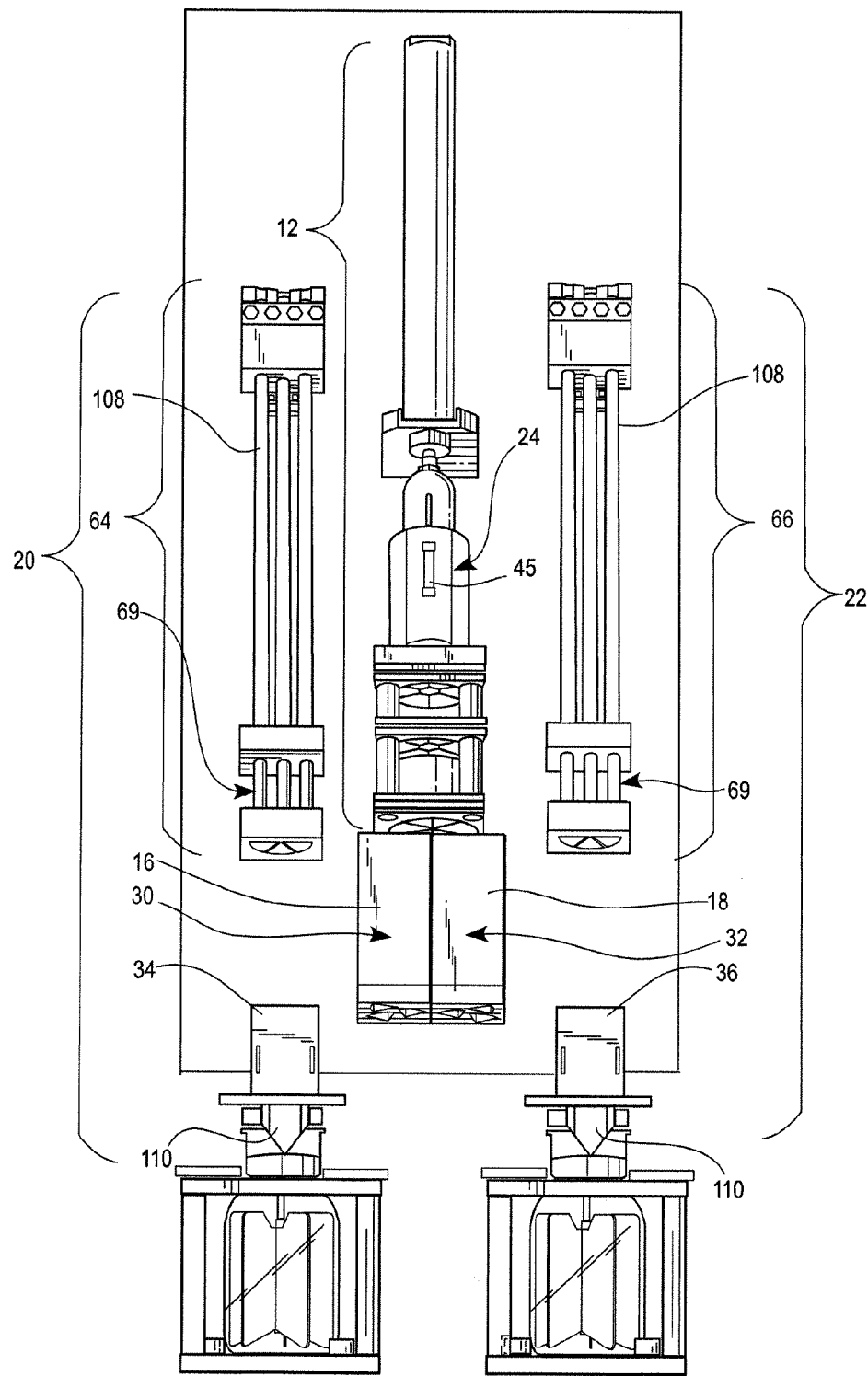
FIG. 11 is a schematic view of a cutting and depositing apparatus in a first position.
Figure 12:
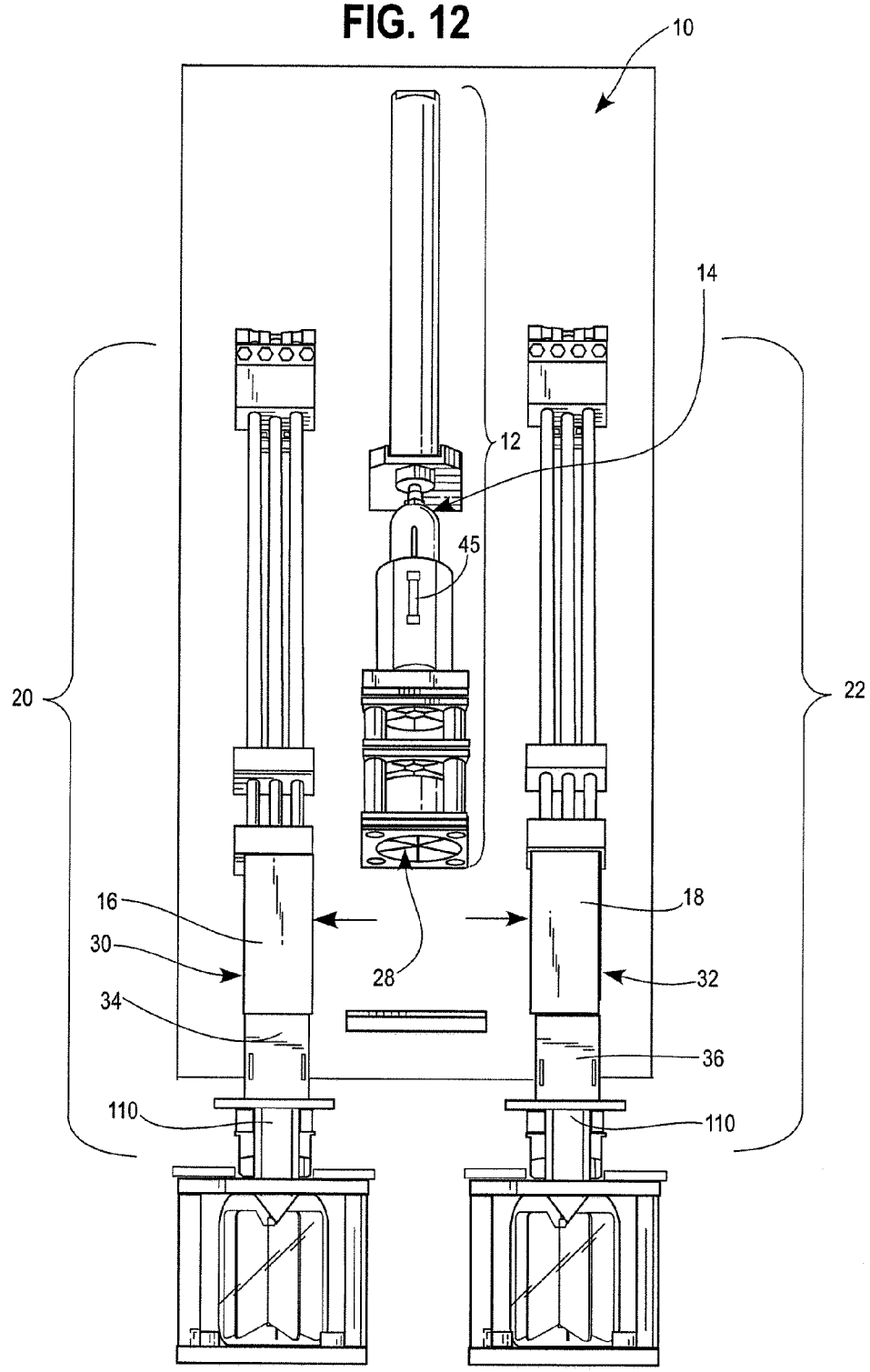
FIG. 12 is the cutting and depositing apparatus of FIG. 11 in a second position.

Once the cucumber has been cut, the cucumber portions move from the cutting frame 40 into the first and second movable chutes 16, 18, which are aligned with the cutting assembly 12 in the first position. FIG. 11 illustrates the movable chutes 16, 18 in the first position. Once the cucumber portions are received in the movable chutes 16, 18, the movable chutes 16, 18 may move from the first position (aligned with the cutting assembly 12) to the second position (aligned with the depositing assembly 20, 22). Further, once the movable chutes 16, 18 are positioned in the second position, the cucumbers are advanced by the depositing driving mechanisms 64, 66 from the movable chutes 16, 18 through the chute extensions 34, 36 and into the containers. As noted above, the first half of the cucumber may be deposited into a first container and a second half of the cucumber may be deposited into a second container. FIG. 12 illustrates the movable chutes 16, 18 in a second position, aligned with the depositing assemblies 20, 22.

In one illustrative embodiment, at least a portion of the cutting assembly 12 is positioned in between portions of the first and second depositing assemblies 20, 22. In such a configuration, the movement of the movable chutes 16, 18 may include a fairly precise lateral movement. In another configuration, the movable chutes 16, 18 may be swung from the first position to the second position in a fairly precise arcuate movement. The movement of the movable chutes is primarily a specific, fairly precise movement that is reciprocating, as opposed to an imprecise shaking movement.

The cucumber portions are moved into the movable chutes 16, 18 from the cutting frame 40 via the driving arm 14, a portion of which can extend at least partially through the cutting element 28. The movable chutes 16, 18, along with twist chutes or first and second chute extensions 34, 36, comprise the first and second chute assemblies 30, 32. The chute assemblies 30, 32 have openings 68 therein. The openings 68 accommodate the cucumber portions or sections created by the cutting assembly 12. The openings 68, which extend the length of the chute assemblies 30, 32 and through both the movable chutes 16, 18 and the chute extensions 34, 36, may change or rotate along the length of the chute assemblies 30, 32. By one approach, the openings 68 primarily change or rotate within the movable chutes 16, 18. In other configurations, the openings 68 primarily change or rotate within the first and second chute extensions 34, 36. Even if the openings 68 change or rotate primarily within the chute extensions 34, 36, however, the movable chutes 16, 18 may still provide some change or movement of the cucumber portions when the movable chutes 16, 18 move from the first position to the second position. Such movement, for example, may move the cucumber portions in a lateral or arcuate movement corresponding to movement of the movable chutes 16, 18. Thus, the cucumbers may experience some adjustment to their orientation from both the movement of the movable chutes 16, 18 and the change or rotation of the openings 68 in the chute extensions 34, 36. In other configurations, the openings 68 will primarily change or rotate within the movable chutes 16, 18 (this rotation is in addition to the lateral or arcuate movement of the movable chutes 16, 18). By yet another approach, the change and rotation of the openings 68 occurs in both the movable chutes 16, 18 and the chute extensions 34, 36.

While the openings 68 may take a variety of configurations, the openings 68 at the entrance of the chute assemblies 30, 32 generally correspond to the cutting elements 28. The entrance of the chute assemblies 30, 32 is positioned adjacent the cutting frame 40 or the top of the chutes 16, 18, in some configurations. Thus, the openings 68 correspond to and can accommodate the cucumber portions that are exiting from the cutting element 28 of the cutting frame 40. FIGS. 13 to 16, which show the movable chutes 16, 18 from a top view, illustrate four different configurations of the opening 68 at the entrance of the movable chutes 16, 18. FIG. 13 includes three openings 68, one of which has a cut face angle, $\nu$, that may be about 48° and two other openings having a cut face angle, $\epsilon$, which may be about 66°. FIG. 14 illustrates three openings each having a cut face angle, $\lambda$, which may be about 60°. In another example, FIG. 15 illustrates openings 68 having one cut face angle, $\rho$, and two cut face angles, $\eta$. Angle $\rho$ may be about 64° and angle $\eta$ may be about 52°. By yet another approach, the cut face angles for one half of the cucumber may include: 68°, 44°, and 68°. By yet another approach, the cut face angles may include: 72°, 72°, and 36°. FIG. 16 illustrates another example that has two openings: a larger opening with a cut face angle, $\kappa$, of between about 105° to about 130° and a larger opening with a cut face angle, $\zeta$, of between about 50° to about 75°.

The openings 68 are configured to change the orientation of the cucumber portions from the configuration at the entrance of the chute assemblies (see, e.g., FIGS. 13 to 16) to the exit configuration (see, e.g., FIGS. 17 to 18). Thus, the openings 68 will arrange at least some of the cucumber portions to have a cut face along the container wall.

More particularly, the openings 68 at the top of the movable chutes 16, 18 (and the chute assemblies 30, 32) correspond to the arrangement of the cucumber portions as they are oriented on their exit from the cutting assembly 12. At the bottom of the chute extensions 34, 36 (and the bottom of the chute assemblies 30, 32), however, the openings 68 correspond to the desired arrangement of the cucumber portions as they are to be oriented in the container 1. FIG. 17 illustrates one exemplary configuration of the openings 68 at the exit of the chute assemblies 30, 32. This configuration of cucumber portions is deposited into one compartment of the divider. FIG. 17 shows one illustrative exit 78 of the chute extension 34. The exit 78 includes two straight portions 80, 82 that correspond to the straight divider wings joined at one end and an arcuate portion 84 that may correspond with the arcuate circumference of the container. FIG. 18 illustrates another exemplary configuration of the openings 68 at the exit of the chute assemblies 30, 32 for a configuration having two spears.

While the movable chutes 16, 18 move from alignment with the cutting assembly 12 to alignment with the depositing assemblies 20, 22, the chute extensions 34, 36 remain aligned with the depositing assemblies 20, 22. In some configurations, the chute extensions 34, 36 move upward and downward during the depositing operation, as discussed below. In other configurations, the chute extensions 34, 36 remain fixed at one position.

Figure 20:
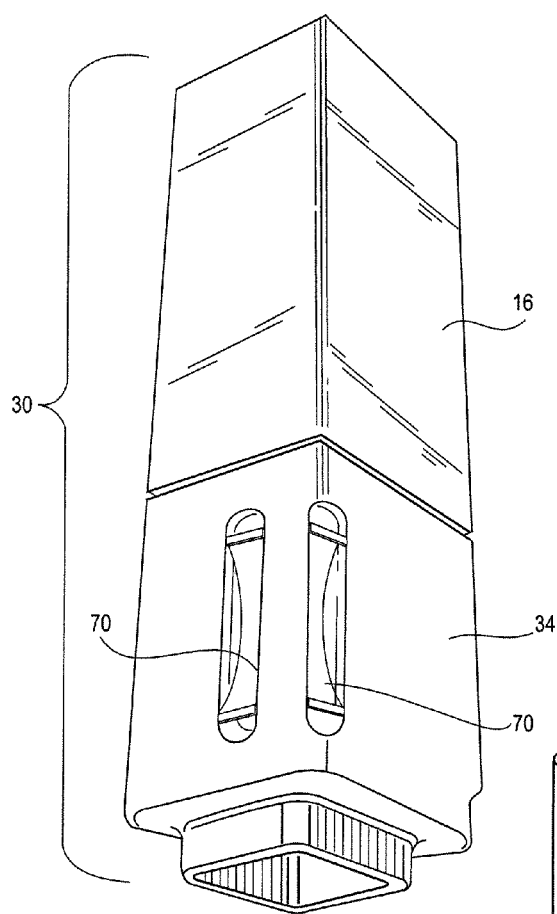
FIG. 20 is a bottom perspective view of a chute assembly.

By one approach, the chute assemblies 30, 32 are formed as a unitary element that is separated into a movable chute 16, 18 and a chute extension 34, 36. FIG. 20 illustrates a chute assembly 30 that has a movable portion 16 and a chute extension 34. Since the chute assembly 30 and the openings 68 therein are formed as a unitary device, the openings 68 from the movable chute 16 are typically easy to align with the openings 68 in the chute extension 34.

Figure 21:
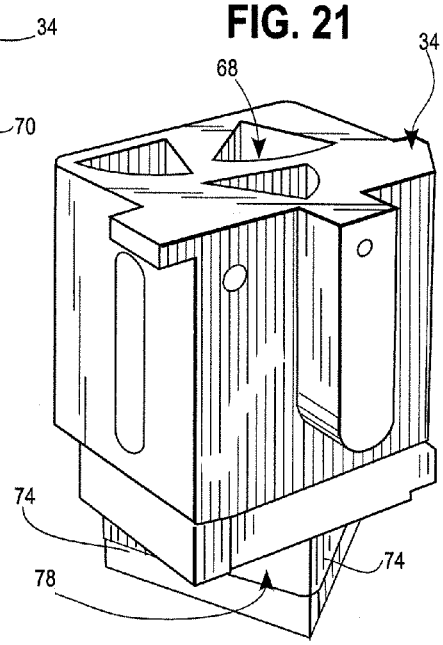
FIG. 21 is a top perspective view of a chute extension.
Figure 22:
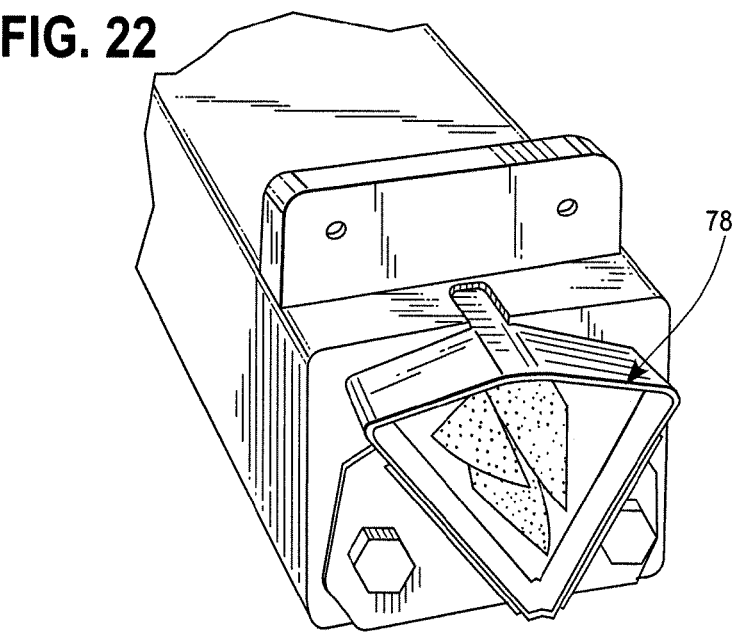
FIG. 22 is a perspective view of a bottom of a movable chute.

FIG. 21 illustrates openings 68 midway along the length of the chute assembly 30. The openings 68 have moved from the orientation at the entrance of the chute assembly 30, but are not yet configured into the arrangement illustrated in FIG. 17, which is deposited into an unfilled divider compartment of the container. FIG. 21 also illustrates guide extensions 74 that guide the cucumber portions from the chute extensions 34, 36 to the unfilled divider compartment.

In operation, the chute assemblies 30, 32 cooperate with the driving arm 14 and the depositing driving mechanism 64, 66 to arrange the cucumber portions into the configuration deposited into the containers. More particularly, the driving arm 14 moves the cucumber portions from the cutting frame 40 into the openings 68 of the movable chutes 16, 18 (when the movable chutes 16, 18 are in the first position) and the driving mechanism 64, 66 moves the cucumber portions from the chute assemblies 30, 32 to the containers (when the movable chutes 16, 18 are in the second position). The driving mechanisms 64, 66 may have pusher extensions 69 attached thereto such that as the driving mechanisms 64, 66 are advanced, the pusher extensions 69 extend and advance through the movable chutes 16, 18 and into at least a portion of the chute extensions 34, 36. As the pusher extensions 69 advance through the chute assemblies 30, 32, the cucumber portions will advance and change position as the openings 68 rotates or changes. Therefore, as the cucumber portions are advanced through the openings 68, the cucumber portions are twisted or rotated into position for depositing the cucumber portions into the containers.

As mentioned, the depositing driving mechanism 64, 66 may include a plurality of pusher extensions 69. The pusher extensions 69, illustrated in FIGS. 11 and 19, extend into the openings 68 when the movable chutes 16, 18 are in the second position. The pusher extensions 69 advance the cucumber portions through the chute assemblies 30, 32. The depositing driving mechanism 64, 66 typically includes a pusher extension 69 for each of the openings 68 in the chute assemblies 30, 32. For example, if the cucumber is divided into six spears, each of the chute assemblies 30, 32 has three openings to accommodate the half of the cucumber received by the respective chute assembly 30, 32. In one illustrative example, each of the depositing driving mechanism 64, 66 may have three pusher extensions 69 that extend into the three openings 68 in the chute assembly 30, 32. By one approach, the pusher extensions 69 have a cross sectional shape that generally corresponds to the opening 68 through which the pusher extension 69 will advance. For example, if the opening 68 is spear-shaped, the pusher extensions 69 will have a spear-shaped cross section. In addition, since the openings 68 have a cross section that changes or rotates, the pusher extensions 69 are mounted onto flexible arms or rods 81 that allow the pusher extensions 69 to rotate within the opening 68.

Figure 19:
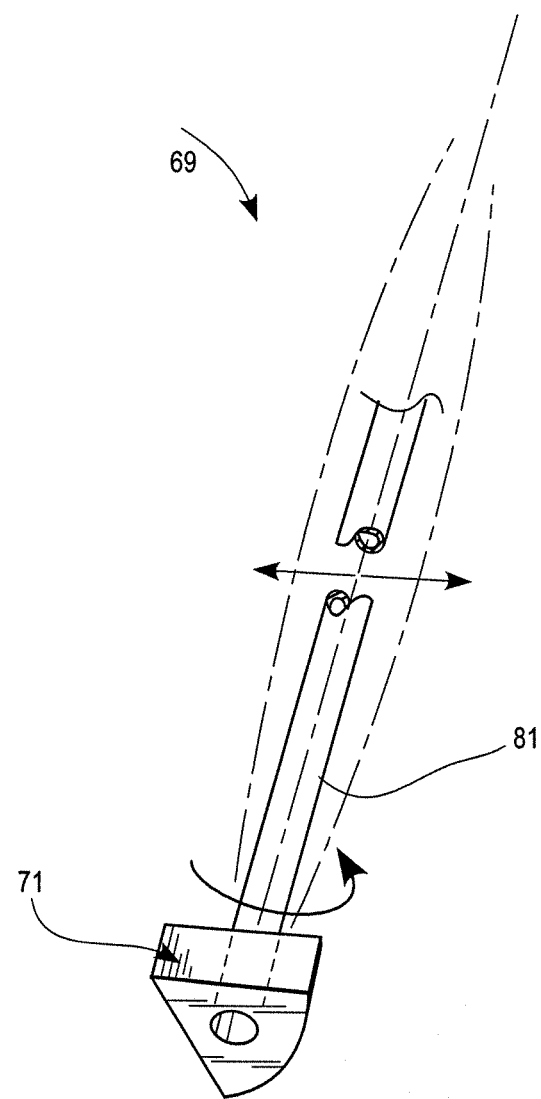
FIG. 19 is a partial schematic view of a pusher extension.

One illustrative pusher extension 69 is illustrated in FIG. 19. The pusher extension 69 may include a flexible rod 81 with a pusher face or shoe 71 at the end thereof that contacts the cucumber portion. The flexible rod 81 may be comprised of a flexible material such as nylon or Delrin and may bend and rotate to accommodate the change in the openings 68. By one approach, the flexible rod 81 has a diameter of between about ¼ in. to about ⅜ in. The pusher face 71 typically has a cross section that corresponds to the cross section of the openings 68. For example, if the openings 68 have a cut face angle of 68° or 48°, the pusher face 71 typically has an angle of 68° or 48° between two straight surfaces that correspond to the cut faces of the opening 68 and an arcuate portion that corresponds to the arcuate wall of the opening 68. In one illustrative example, the pusher face 71 fills the opening such that the clearance on the sides of the pusher face 71 is approximately ⅟32 in. Having a pusher face 71 that substantially fills the entire cross section of the opening 68 is particularly useful when the cucumber sections being loaded do not have upper ends that have been cut.

To prevent the cucumber portions from falling through the chute extensions 34, 36, at least one brake 70 (see, e.g., FIG. 20) may be incorporated therein. By preventing the cucumber portions from falling through the chute extensions 34, 36, each of the cucumber portions may advance through the chute assemblies 30, 32 at approximately the rate time such that they are deposited into the container together. In one configuration, at least one brake 70 extends into each of the openings 68. The brake 70 may take a variety of forms. In one configuration, the brake 70 includes a spring like member that bends into the opening 68 to slow the downward movement of the cucumber portion.

The cucumber portions are pushed through the chute assemblies 30, 32 via the driving arm 14 and the depositing driving mechanisms 64, 66. The driving movement helps move, twist, and rotate the cucumber portions into the configuration that is deposited into one compartment of the container divider 72. The change in the orientation from the cucumbers portions as they exit the cutting assembly 12 to the orientation of the cucumber portions as they enter the containers also is effected by the movement of the movable chutes 16, 18 from the first position to the second position.

The openings 68 of the chute assemblies 30, 32 have a cross section that rotates the cucumber section as the cucumber section is being advanced through the openings 68 by the driving arm 14 or driving mechanism 64, 66. The orientation of the cucumber portion changes so that at least a portion of the cut face of the cucumber section is adjacent the wall of the container and the cucumber section having skin disposed thereon is not positioned along the container wall.

Figure 23:
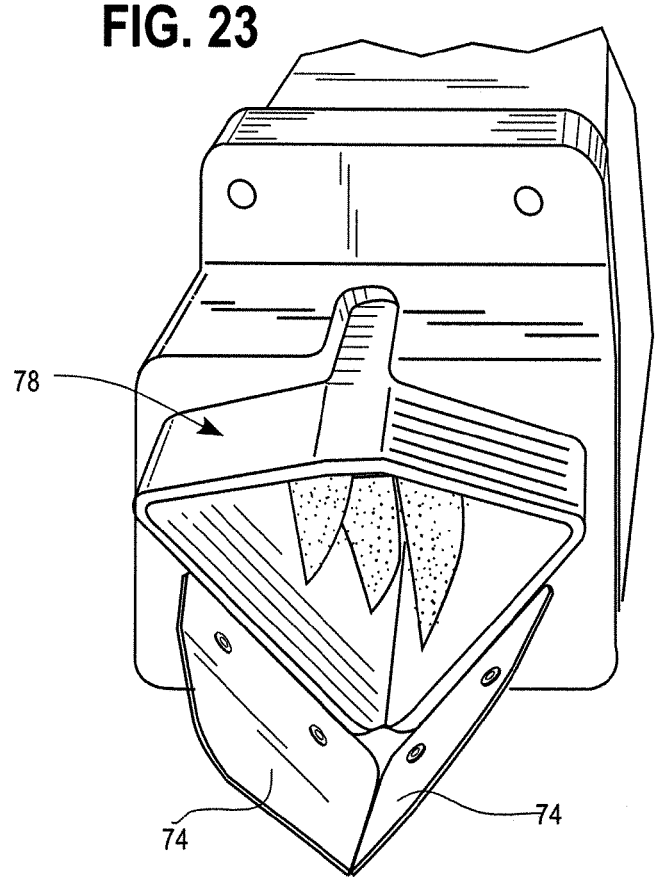
FIG. 23 is another perspective view of the movable chute of FIG. 22.
Figure 29:
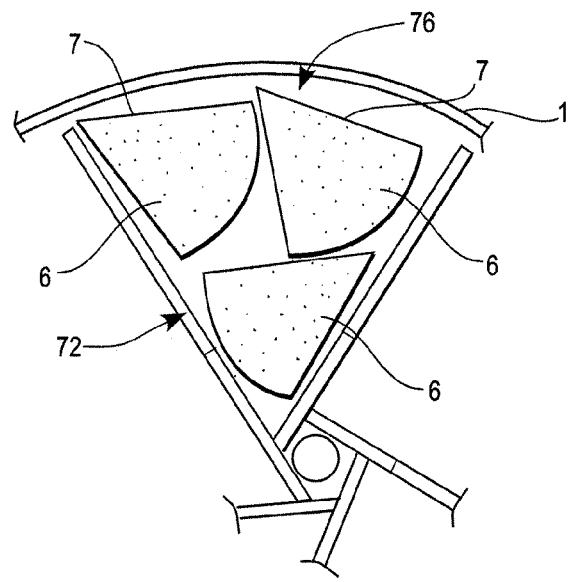
FIG. 29 is a schematic view of a portion of the divider of FIG. 24 having cucumber portions deposited therein.

Referring briefly to FIG. 29, a portion of a divider 72 is shown having one half of a cucumber deposited into one compartment 76 of the divider 72. The cucumber portions or sections 6 have cut faces 7 that are disposed along the container wall 1. As illustrated in FIGS. 21 and 23, the chute extensions 34, 36 may have chute guides 74 that help direct the cucumber sections 6 from the exit 78 of the chute extensions 34, 36 to a compartment 76 of the divider 72 in the container 1. FIG. 23 illustrates one illustrative example of such chute guides 74. By one approach, the chute guides 74 may be flanges or flaps that extend from the exit of the chute extension 34, 36. In the illustrative example of FIGS. 21 and 23, the chute guide 74 includes two flaps extending from the straight portions 80, 82 of the exit 78. The chute guide 74 directs or guides the cucumber portions into the desired divider compartment 76 of the container 1 and prevents the cucumber portions from being unintentionally being pushed into a divider wing or deposited into other divider compartments. By another approach, the chute guide 74 may include an arcuate portion that directs the cucumber portions into the container and prevents the cucumber sections from being deposited outside of the container.

The container 1 may include a variety of receptacles such as, for example, jars, cans, or bowls, to note a few of many options. The containers also may have a variety of configurations with rounded edges or a shoulder that connects the side walls of the container with the neck of the container. Furthermore, the containers 1 may be comprised of a variety of materials such as, for example, glass, metal such as tin or aluminum, and any of a variety of plastic or composite materials. A variety of container sizes may be loaded with cucumbers. In one illustrative example, the container 1 is a glass jar having about 24 ounces of pickled cucumber therein. The container 1 may be about 5 to 6 inches tall with a diameter of between about 3 to 4 inches. Other embodiments, however, may be larger or smaller. Further, the container 1 may have straight side walls, a neck and openings therein, and a rounded shoulder that connects the side walls to the neck. By one approach, the container 1 may be about 5.5 inches tall with a main body having a diameter of about 3.7 inches. In such a configuration, a neck of the container 1 may have an inside dimension of about 2.8 inches or about one inch less than the diameter of the body of the container. Further, whatever size the container, the divider 72 must fit through the opening at the neck of the container 1. In other configurations, the container size may be between about 5 in. to about 7 in.

Figure 24:
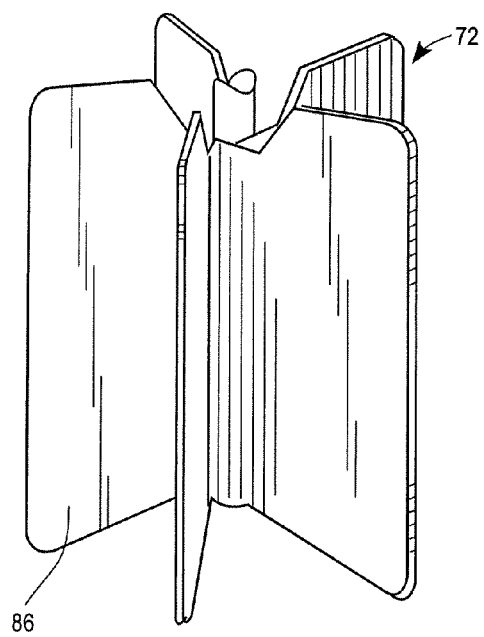
FIG. 24 is a perspective view of a divider.
Figure 25:
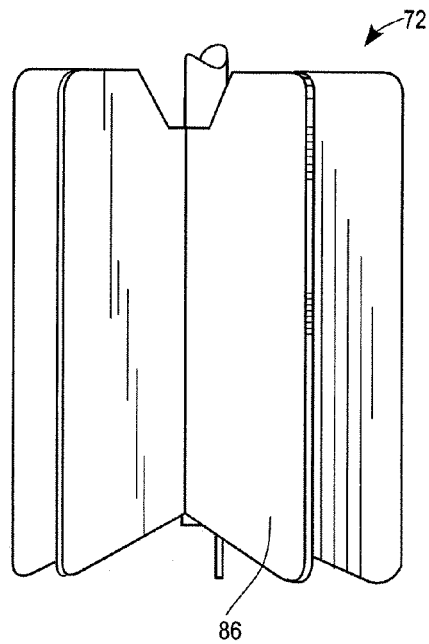
FIG. 25 is a side view of the divider of FIG. 24.
Figure 26:
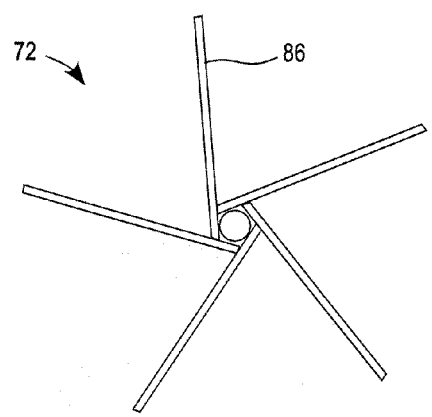
FIG. 26 is a top view of the divider of FIG. 24.
Figure 27:
FIG. 27 is a perspective view of an alternative divider.
Figure 28:
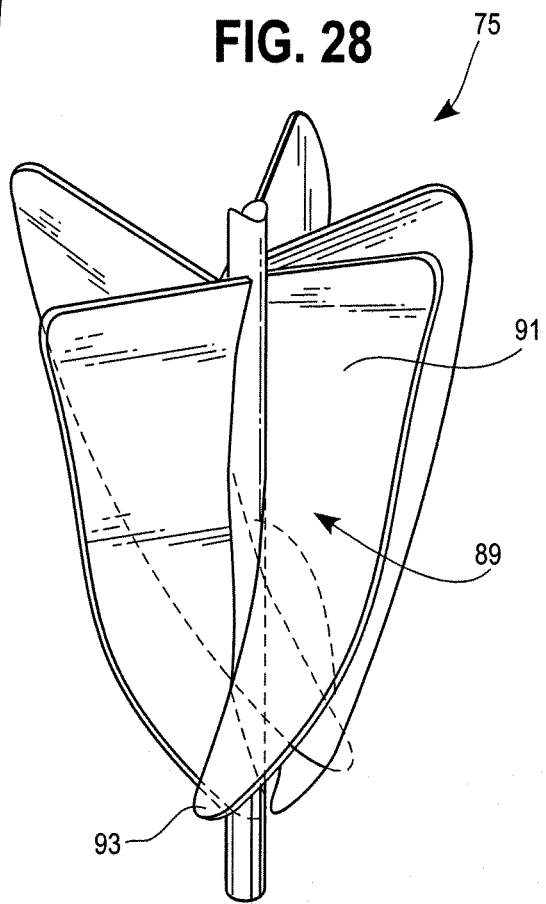
FIG. 28 is a perspective view of another alternative divider.

As noted above, the divider 72 is disposed or deposited into the container 1 prior to the container being filled with cucumber portions. By one approach, the divider 72 is disposed into the interior of the container 1 once the container 1 is positioned in alignment with the chute extensions 34, 36 and the driving mechanisms 64, 66. The dividers 72 generally have radially disposed divider wings 86. Further, the divider 72 is disposed into the interior space of the container such that the inside of the container is divided into compartments defined by the divider wings 86 and the wall of the container 1. FIGS. 24 to 26 illustrate one divider configurations with straight divider wings 86. FIG. 26 illustrates the five divider wings 86 being disposed around a central rod, post, or portion 88. Another illustrative configuration is shown in FIG. 27 having slanted divider wings 87. If slanted divider wings 87 are employed, the divider 73 may be rotated when it is pulled outward from the filled container 1. In yet another configuration, a divider 75 includes divider wings 89 that have a slanted portion 91 and a spiraled portion 93. The divider 75 may be used with longer cucumbers, which would otherwise not fit into the container except for being arranged in a spiral configuration.

Once the divider 72, 73, 75 is in position within the container 1, the chute extensions 34, 36 may position themselves adjacent the divider 72, 73, 75. More particularly, in some configurations, the chute extensions 34, 36 may move away from the opening of the container 1 while the dividers 72, 73, 75 are being positioned into and removed from the containers 1. In one illustrative configuration, the chute extensions 34, 36 may move upward into the space occupied by the movable chutes 16, 18 in the second position. Thus, by one approach, the chute extensions 34, 36 may move (i.e., upward and downward) to provide clearance for the movement of the dividers 72, 73, 75. However, in other configurations, the chute extensions 34, 36 may be set and the clearance for the dividers 72, 73, 75 provided by other mechanisms. For example, the dividers 72, 73, 75 may be placed into the containers 1 prior to positioning the container 1 adjacent the chute assemblies 30, 32.

FIG. 29 illustrates how a compartment 76 of the divider 72 appears with cucumber portions loaded therein. Once the cucumber portions have been deposited in a compartment, the divider 72 may rotate to align another unfilled compartment 76 with the exit 78 of the chute extensions 34, 36. The container 1 may be rotated by wheels 90 (FIG. 1) adjacent an end of the container 1 that is opposite the end with the container opening. The spears are securely packed within the divider compartments 76 and, thus, by rotating the container 1, the divider 72 disposed within the container is also typically rotated by the friction between the spears, divider, and container. Furthermore, to ensure that the divider 72 has rotated the desired amount an aligning or indexing mechanism may be employed. An indexing mechanism 110 (see, e.g., FIGS. 41-43) may be used to align the desired unfilled compartment 76 with the exit 78 of the chute extension 34, 36 by extending downward and slightly into the divider compartment 76 as discussed below.

To rotate the container by the wheels 90, the container may abut the wheels 90 or a belt (not shown) around some of the wheels to induce rotation of the container. In one illustrative embodiment, wheels 90 are deposited around the lower end of the container. A variety of configurations may be employed. In one configuration illustrated in FIG. 1, the containers are moved into position underneath the chute extensions 34, 36 by arrows 85. By one approach, two wheels are disposed along one arcuate portion of the container (the right arcuate portion in FIG. 1) and a third spring-loaded wheel is disposed along another arcuate portion (the left arcuate portion of FIG. 1) of the container such that the third wheel pushes the container into engagement with the other two wheels. More particularly, the spring-loaded gear is pushed outward as the container is moved into position adjacent the chute extensions 34, 36 and once the container is below the chute extensions 34, 36 the spring-loaded gear pushes the container into engagement with all three wheels 90. In other configurations, four wheels may be employed and, in such approaches, two of the wheels may be spring-loaded.

To fill an entire container 1 with cucumber portions, a cucumber is cut and half of the cut cucumber is deposited into each of the open divider compartments 76. During operation, a single stroke of the driving arm 14 advances a cucumber through the cutting frame 40 and into the movable chutes 16, 18. The movable chutes 16, 18 are moved from alignment with the cutting frame 40 to alignment with the depositing driving mechanism 64, 66. Then, a single stroke of the depositing driving mechanism 64, 66 and pusher extensions 69 advance the cucumber portions out of the chute assemblies 30, 32 and into a single compartment 76 of the containers 1. Once the divider compartment 76 is filled, the depositing driving mechanism 64, 66 and pusher extensions 69 retract and the movable chutes 16, 18 return to alignment with the cutting frame 40 where they receive a second set of cucumber portions from the cutting frame 40. This second set of cucumber portions will be deposited into an unfilled divider compartment 76 of the divider 72.

Prior to depositing the cucumber portions into the container 1, the divider 72 is lowered into the container 1 and the chute extensions 34, 36 are positioned adjacent the opening of the container 1. Once the divider 72 and chute extensions 34, 36 are in position, the driving mechanism 64, 66 may advance the cucumber portions through the chute assemblies 30, 32 and into a first unfilled compartment 76 of the divider 72.

By one approach, the divider 72 creates five compartments 76 in the container 1. Since each compartment is filled by one half of a cucumber and each cucumber is divided into two containers, five cucumbers are cut and deposited into two containers.

Figure 41:
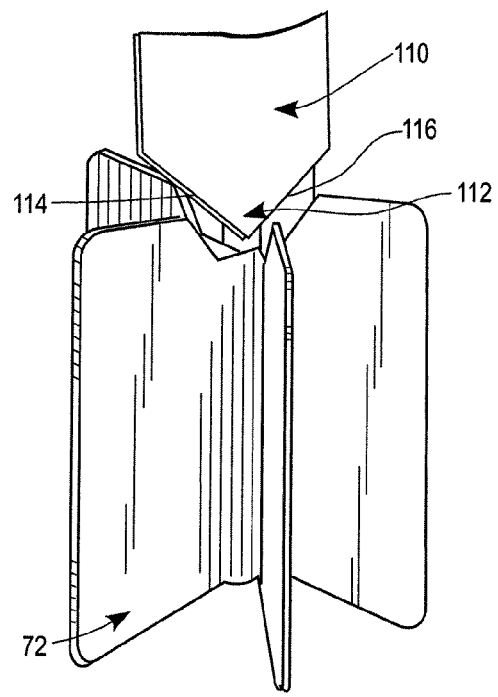
FIGS. 41, 42, and 43 are perspective views of a divider and an indexing mechanism
Figure 42:
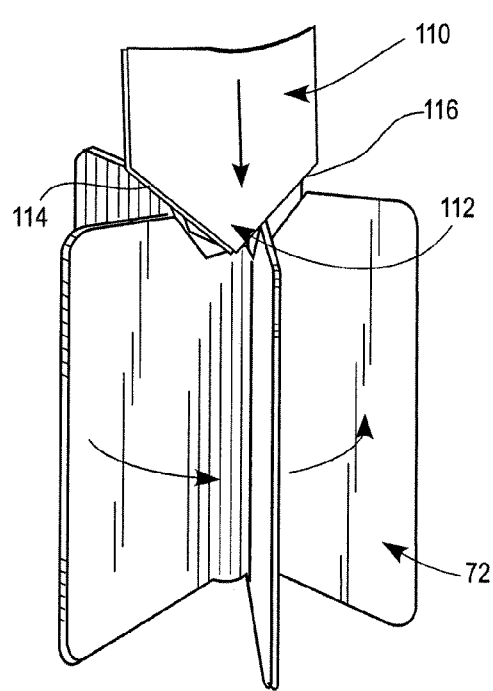
Figure 43:
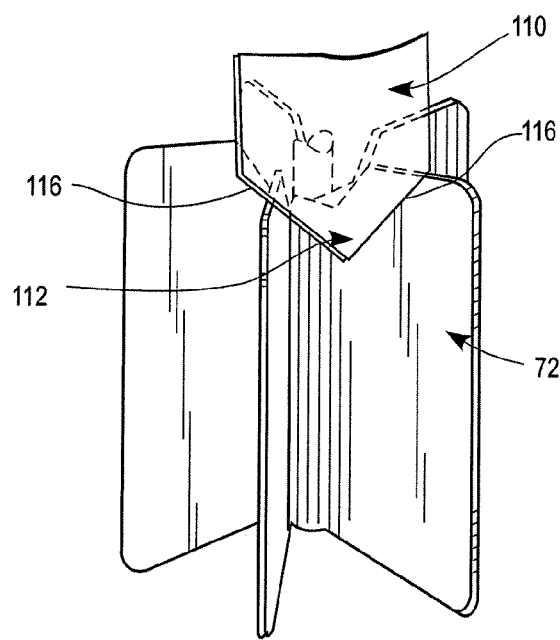
Figure 44:
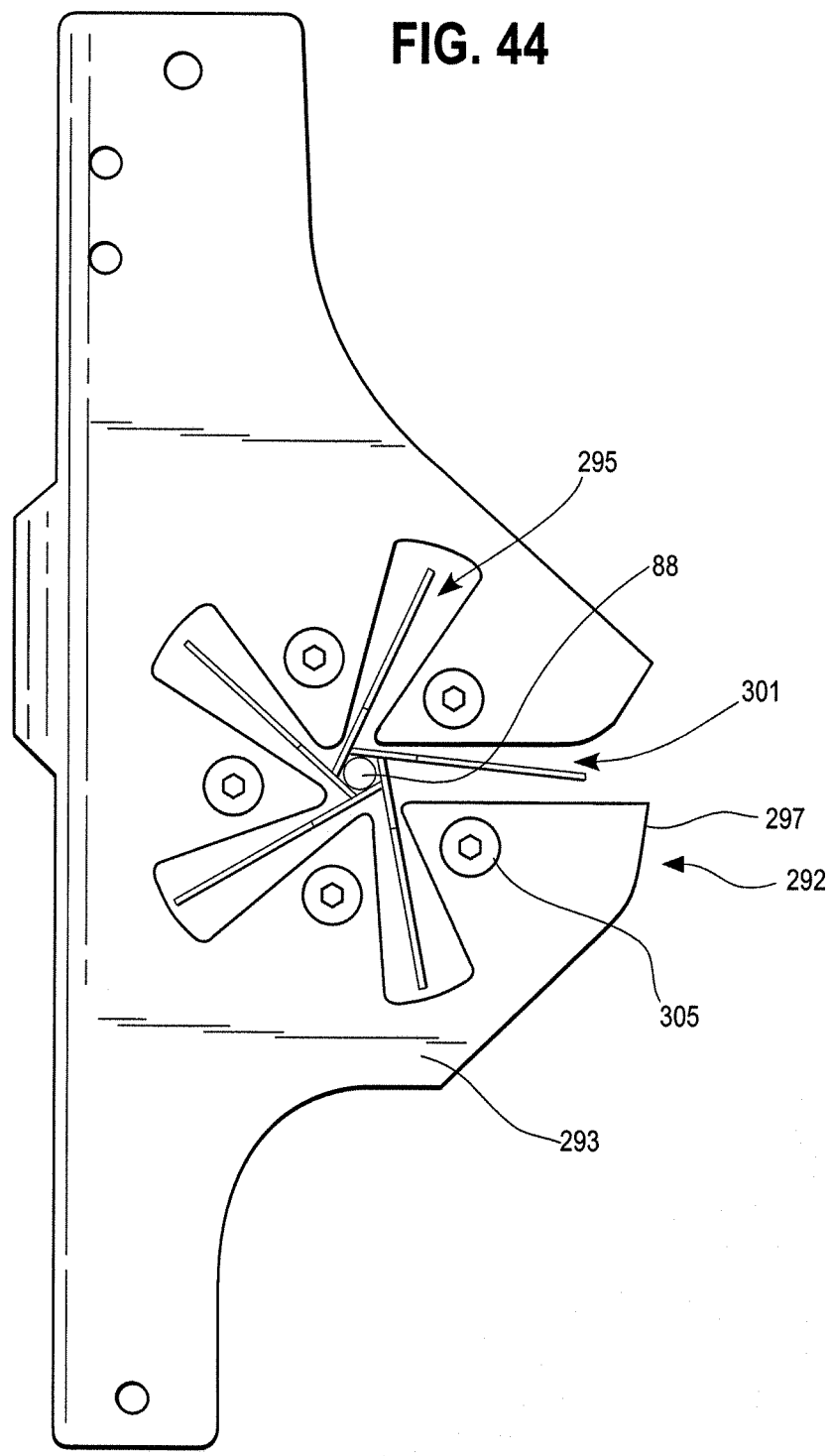
'
FIGS. 44 and 45 are views of an alternative stripper blade.
Figure 45:
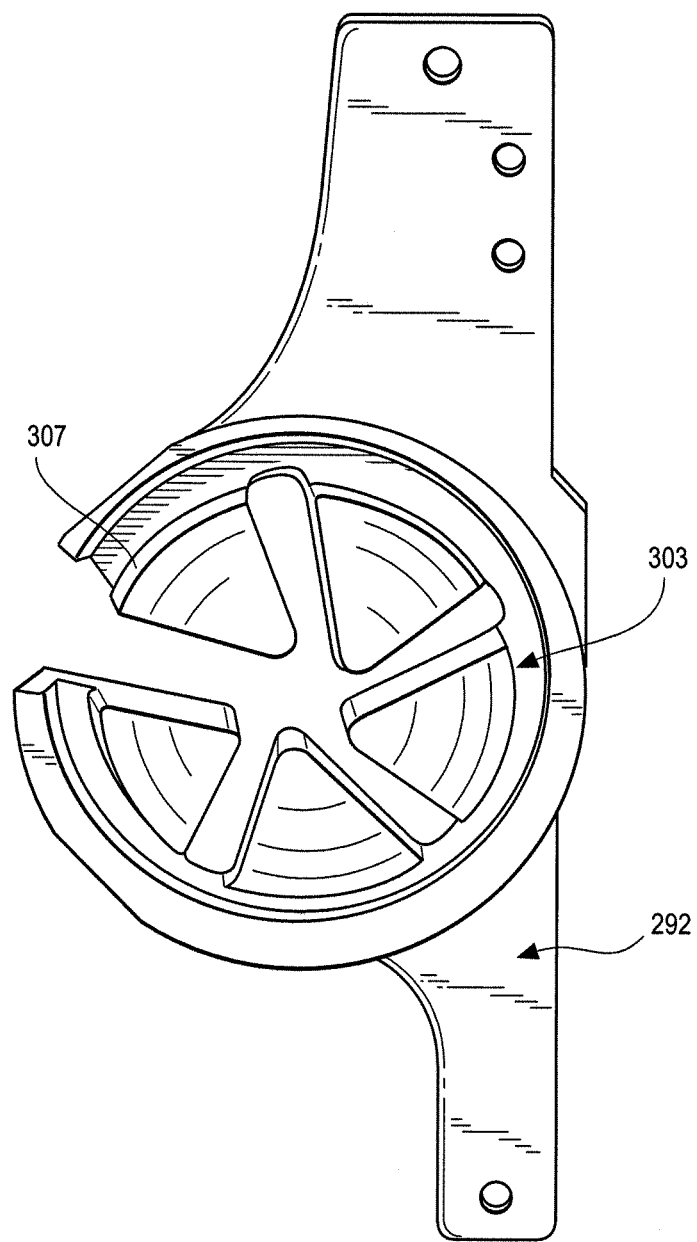
Figure 46:
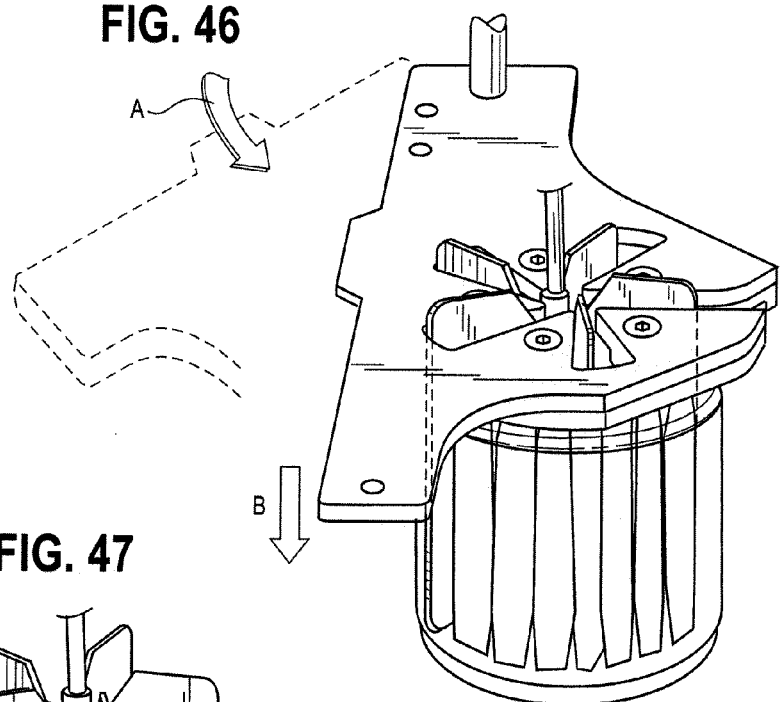
FIGS. 46 and 47 are perspective views of a stripper blade, a divider, and a filled jar.
Figure 47:
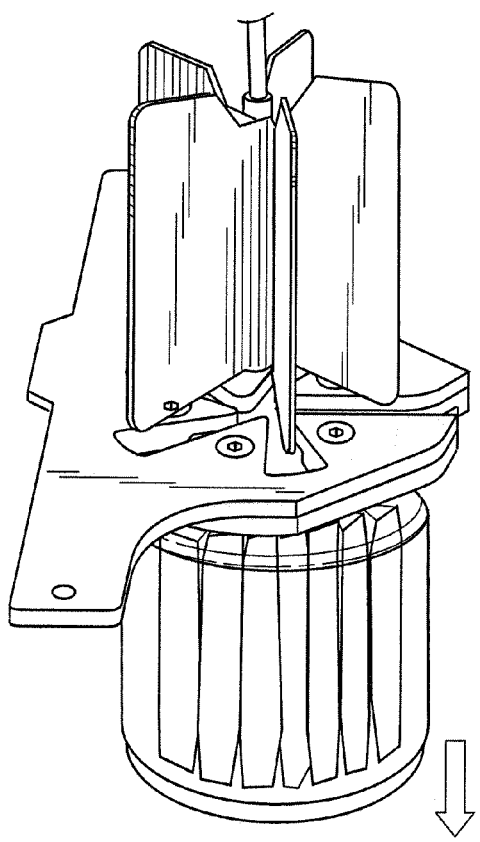

As noted above, wheels 90 may be used to rotate the container 1 and the divider 72 disposed in the container 1, once at least one compartment of cucumber spears have been deposited into the container 1. To align an unfilled divider compartment 76 with the chute extensions 34, 36, an indexer may be employed. In one approach, indexing mechanism 110 is employed. As shown in FIGS. 41 to 43, indexing mechanism 110 includes a tapered section 112 that has two edges 114, 116. The two edges 114, 116 each contact a wing 86 of the divider when the indexing mechanism 110 is seated atop the divider 72 and the divider 72 is properly aligned with the exit 74 of the chute extension 34, 36.

Figure 38:
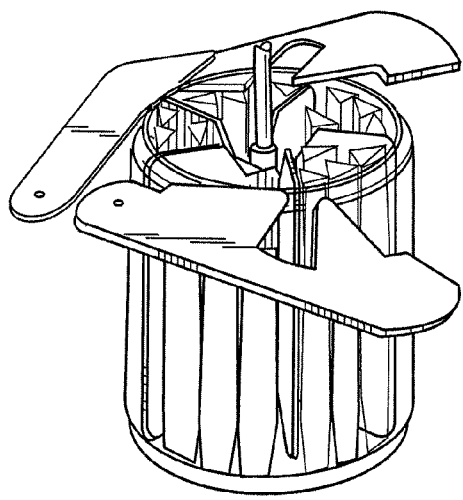
FIGS. 38, 39, and 40 are perspective views of a set of stripper blades, a divider, and a filled jar.
Figure 39:
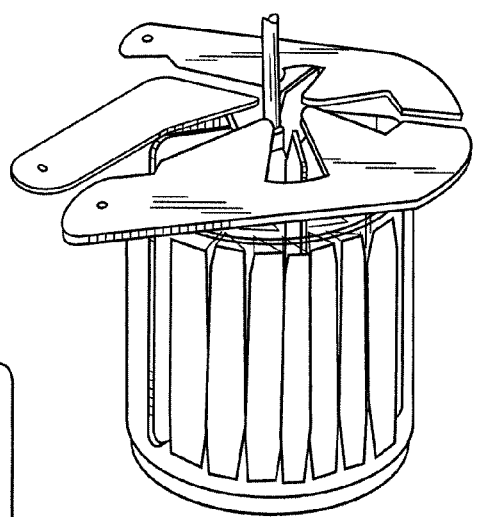
Figure 40:
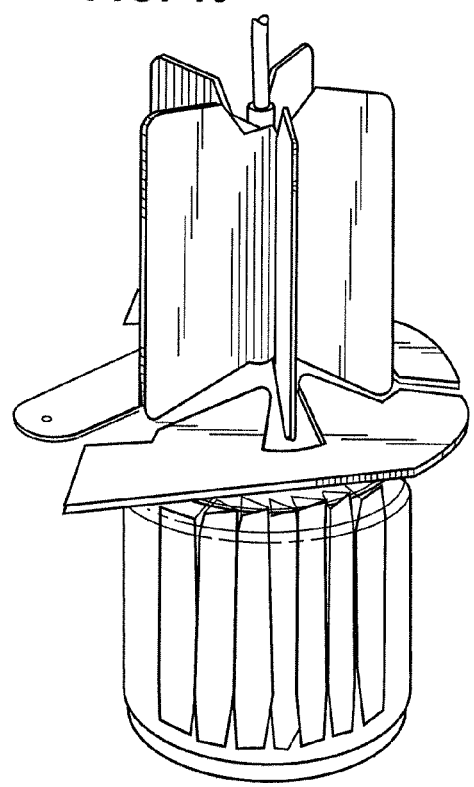

While the container 11 is being filled with cucumber portions, a set of stripper blades 92 are positioned in a first position (FIG. 38), which allows the cucumber portions to be deposited into the container. Once an entire container is filled, the stripper blades 92 are moved to a second position that covers the compartments 76 of the container 1 (FIG. 39). Slots 100 permit removal of the divider from inside the container without permitting withdrawal of the cucumber portions. The slots 100 are disposed within and in between the stripper blades 92 when the stripper blades 92 are disposed in the second position. Since the cucumber portions may be tightly packed into the container 1 with the divider 72, if the divider is pulled out of a filled container, the cucumber portions may be pulled out or withdrawn from the container, due to the friction between the cucumber portions and the divider 72. Thus, by having the stripper blades 92 at the opening of the container 1, the cucumber portions are retained within the container 1, while the divider 72 is removed therefrom. FIG. 40 illustrates the divider 72 removed from a filled container while the stripper blades 92 are in the second position.

Figure 30:
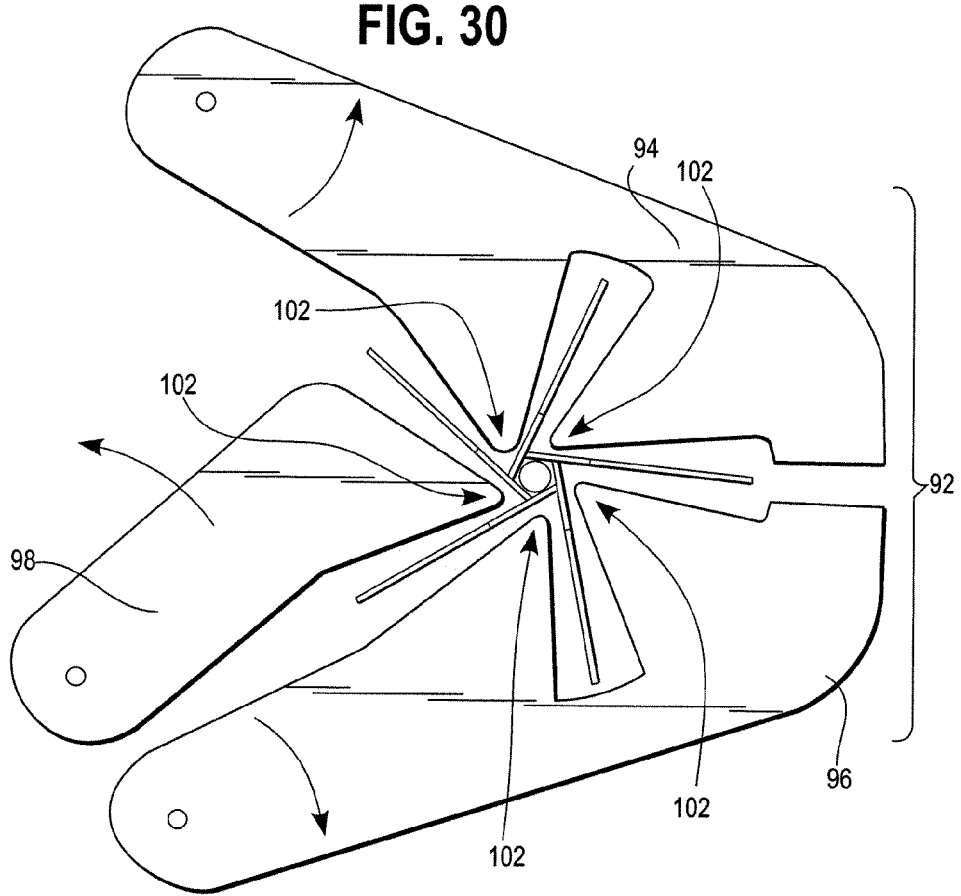
FIG. 30 is a top view of a pair of stripper blades and the divider of FIG. 24.

By one approach, as illustrated in FIG. 30, the stripper blades 92 may include three separate blades 94, 96, 98 that operate together to cover the compartments 76 as the divider is removed from the container 1. FIG. 30 shows that the stripper blades 94, 96 may have two extensions 102 that cover two of the compartments 76 and the stripper blade 98 may have one extension 102 that covers one of the compartments 76.

After the divider 72 has been removed from the container 1, the stripper blades 92 may be retracted to the first position. The first position of the stripper blades 92 also may be employed when the divider 72 is being deposited into the empty containers prior to filling with the cucumber portions. Once the divider 72 has been removed from the containers, the filled containers 1 may be advanced to other stations for further processing such as, for example, filling the containers with brine or closure operations. Additional empty containers 1 may then be advanced into the cutting and depositing assembly 10 for filling with cucumber portions.

Figure 31:
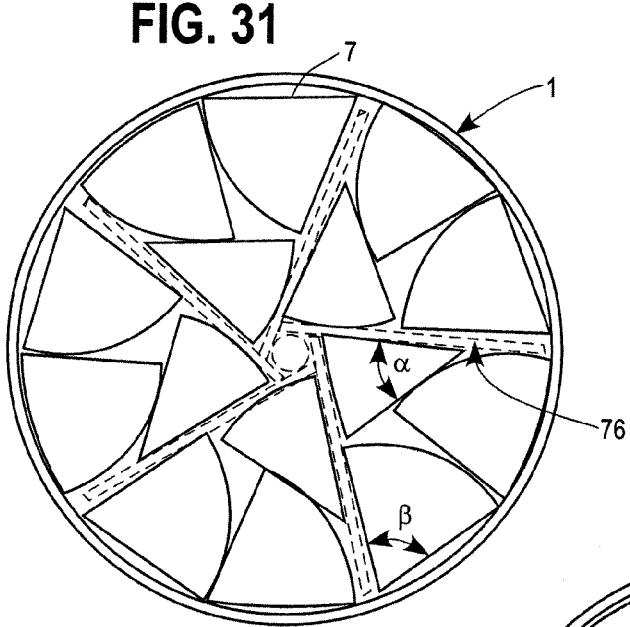
FIGS. 31, 32, and 33 are schematic views of configurations of jars filled with cucumber portions.
Figure 32:
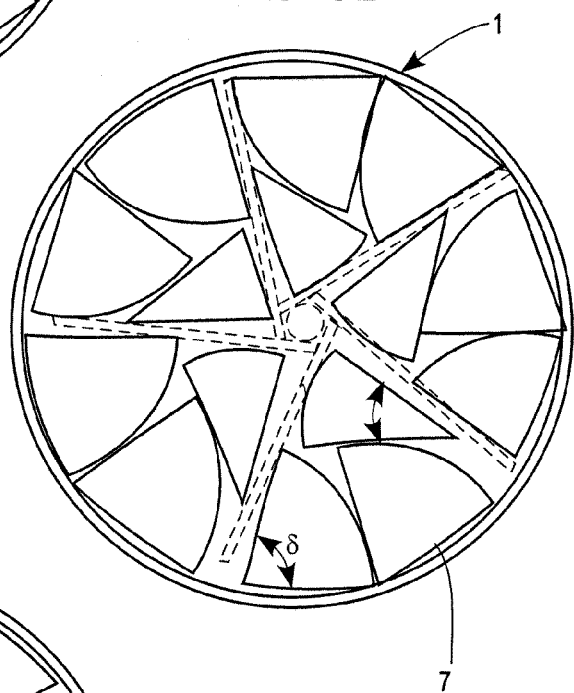
Figure 33:
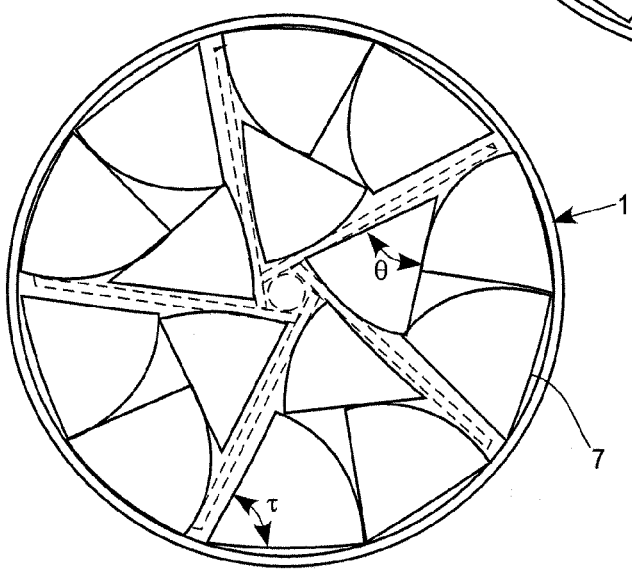

As discussed above with respect to FIGS. 5 to 10, the arrangement of the cutting elements 28 may be adjusted to produce differently shaped and sized cucumber portions. The size and shape of the cucumber portions created by the cutting element 28 affect how to cucumber portions are arranged in a filled container. Within a single container, there may be variation in the size of the cucumber portions, though there is substantial consistency with regard to the general shape of the cucumber portion (i.e., a container may include only spear-shaped portions or only cucumber slices). By one approach, the cucumber spears cut and deposited into the containers may or may not be of a similar size or cross section. FIGS. 31 to 33 illustrate containers with differently sized spear-shaped cucumber portions. More particularly, FIGS. 31 to 33 illustrate configurations of filled containers that have three spears filling each of the divider compartments (shown in dashed lines). The three spears do not have equal cut face angles.

The filled container 1, illustrated in FIG. 31, has divider compartments 76 with three cucumber spears: two spears have a cut face angle $\beta$ and one spear has a cut face angle $\alpha$. The cut face angle $\beta$ may be from 63° to 72° and cut face angle $\alpha$ may be from 39° to 49°. By one approach, $\beta$ angle may be about 68° and $\alpha$ angle may be about 44°. The filled container 1 includes a total of 15 cucumber portions or spears. More particularly, five of the fifteen spears have a $\beta$ cut face angle and ten of the fifteen spears have an $\alpha$ cut face angle. As shown in FIG. 31, a portion of the cut face 7 of the ten cucumber spears having a $\beta$ cut face angle are arranged adjacent to the wall of the container 1.

The filled container 1, illustrated in FIG. 32, also has divider compartments 76 with three cucumber spears: two spears having a cut face angle $\delta$ and one spear having a cut face angle $\gamma$. The cut face angle $\delta$ may be from 67° to 77° and the cut face angle $\gamma$ may be from 31° to 42°. By one approach, $\delta$ angle may be about 72° and $\gamma$ angle may be about 36°.

The filled container 1, illustrated in FIG. 33, also may have three cucumber spears in each of the divider compartments 76: two spears having a cut face angle $\tau$ and one spear having a cut face angle $\theta$. The cut face angle $\tau$ may be from 59° to 69° and the cut face angle $\theta$ may be from 47° to 57°. By one approach, $\tau$ may be about 64° and $\theta$ may be about 52°.

Figure 34:
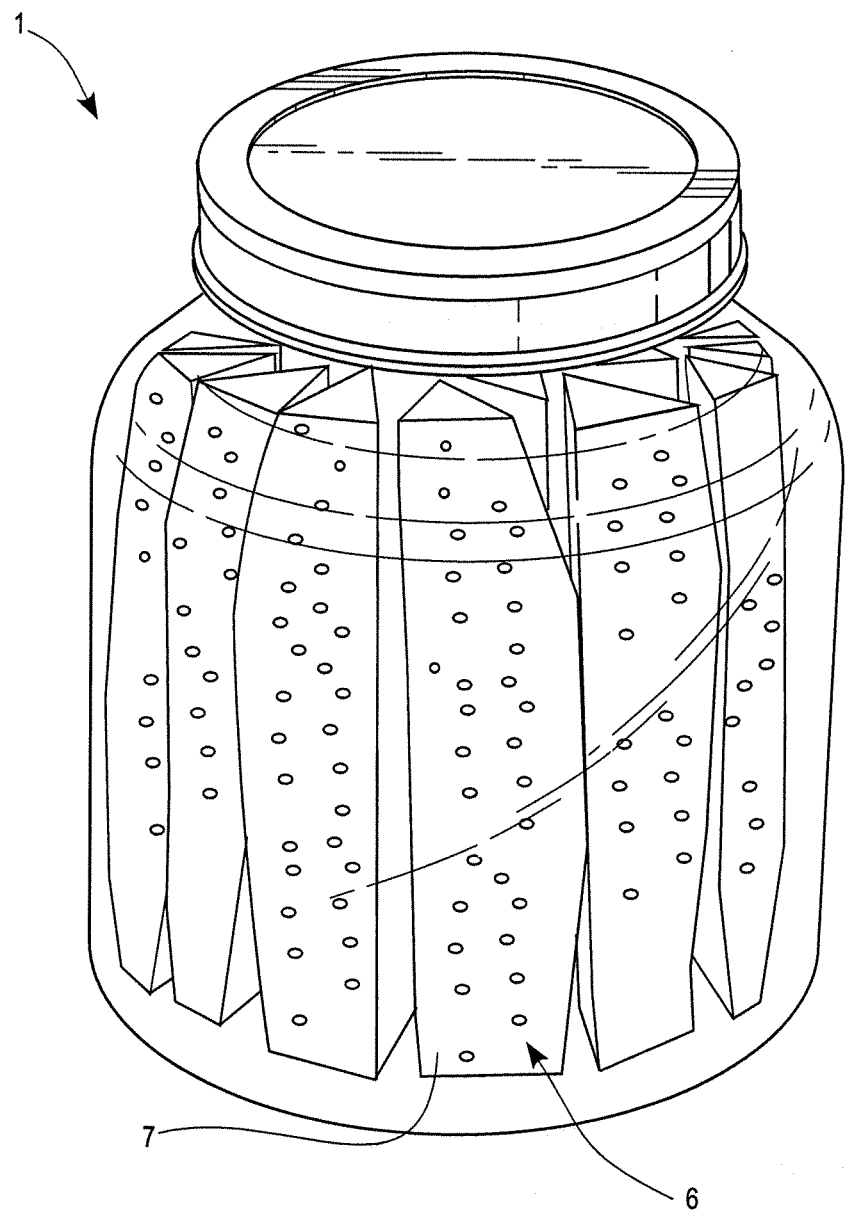
FIGS. 34, 35, 36, and 37 are perspective views of a jars filled with cucumber portions.

FIGS. 31 to 33 illustrate how at least a portion of the cut faces of the cucumber are generally positioned along the wall of the container (or at least partially visible through the wall of the container) and the cucumber portion having the skin disposed thereon is generally disposed toward the center of the container, at least for the cucumber sections on the outside ring of the container. In the configurations shown in FIGS. 31 to 33, ten cucumber spears are disposed around the circumference of the container wall. Further, once the container is filled with cucumber spears (as shown in FIG. 34), a portion of the cut faces 7 of those ten cucumber spears is disposed adjacent the cucumber wall and the cucumber portion having skin thereon is disposed away from the container wall.

Figure 35:
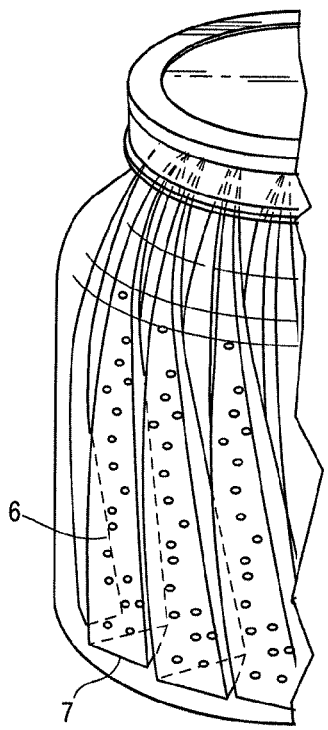
Figure 36:
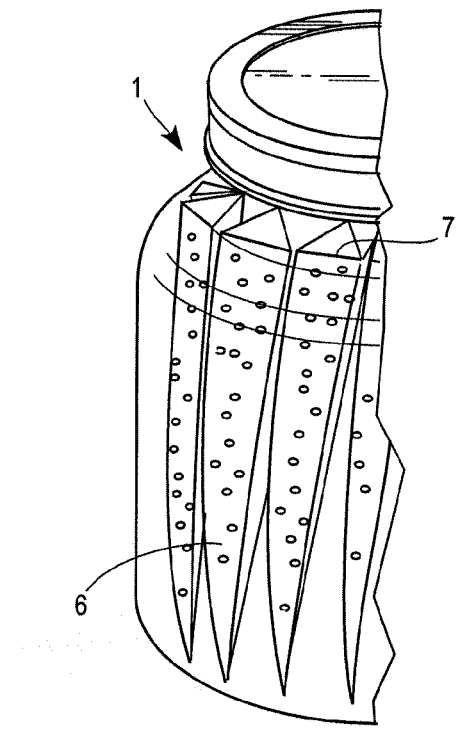
Figure 37:
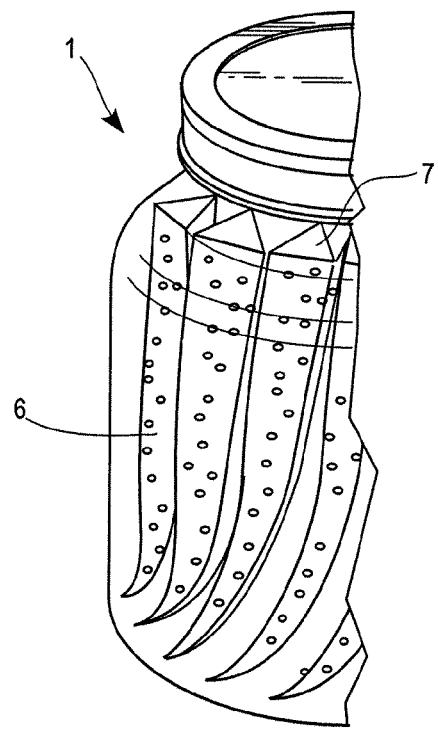

The configuration of the apparatus 10 allows it to be employed with a variety of cucumber sizes. For example, the centering devices (e.g., flexible membranes 42, 44, centering members 45), allow the apparatus 10 to be used with a variety of cucumber widths. In some configurations, the length of the cucumbers will be trimmed prior to the cutting and depositing operation, which cuts the cucumber along its length and the loads the cut cucumbers into the containers. For example, FIG. 34 illustrates cucumbers that have had their upper and lower ends cut to a predetermined length. In another configuration, only one end of the cucumber will be cut such as, for example, the bottom end of the cucumbers (see FIG. 35) or the top end of the cucumbers (see FIGS. 36-37).

In addition, the dividers 72, 73, 75 may permit the apparatus 10 to be used with a variety of cucumber lengths. For example, cucumbers that are within a predetermined length (such as by measuring and selecting cucumbers within that range or trimming the cucumbers to the predetermined length), may fit easily into the divider 72 having straight, vertical wings 86. For cucumbers having a longer length, the angled wing divider 73 or the spiral divider 75 may be used (see, e.g., FIGS. 35 and 37). By yet another approach, a longer cucumber may be employed if the uncut end of the cucumber is disposed near the opening of the container 1 (see FIG. 35). In such a configuration, the tapered ends of the cucumber portions 6 (which are generally more pliable) may extend into the neck of the container 1.

An alternative containment mechanism—to be used when the divider is removed from a filled container—is illustrated in FIGS. 44-47. As illustrated above, the containment mechanism or stripper blade 92 may include a plurality of distinct sections or blades. Alternatively, the stripper blade may be comprised of a single blade or plate. The stripper blade 292 includes a single plate 293 that has an opening 295. The opening 295 of the stripper blade 292 is large enough to permit the divider to pass therethrough. The opening 295, thus, may have a central opening portion and a plurality of radially openings from the central opening that correspond to each of the blades of the divider. One of the opening extensions 301 extends completely to a side wall 297 of the stripper blade 292 such that the divider post can pass therethrough, as described below.

As illustrated in FIGS. 24-28, the divider 72, 73, 75 may have a central post 88 from which the divider wings 86, 87, 89 extend. In one illustrative operation, the divider is disposed onto the container by the raising and lowering of the containers relative to the apparatus 10, and the divider is attached to the depositing assembly 20, 22 via the post 88. To configure the stripper blade 292 on top of the filled container, the stripper blade 292 is rotated or swung into position above the container (as illustrated by arrow A in FIG. 46), and then lowered onto the top of the container (as illustrated by arrow B in FIG. 46). As the stripper blade 292 is swung into position over the container, the divider post 88 is moved through the opening extension 301 and into the center of opening 295, at which point the stripper blade 292 may be lowered onto the container. As discussed below, the stripper blade 292 may be lowered between about ½ inch to about 1 inch and onto the top of the container.

In addition to the plate 293, the stripper blade 292 may have an extension block 303. The extension block 303 may be secured to the plate 293 via fasteners 305, illustrated in FIG. 44. The extension block 303 may be comprised of Nylon, Derlin, or another material suitable for food processing. The extension block 303 may extend from the plate 293 such that the stripper blade 292 has a thickness of about ½ inch to about 1.25 inches. In one configuration, the extension block 303 extends from the stripper plate 293 about ¾ inch. When the container is disposed directly underneath the plate 293, the extension block 303 extends into the container. As mentioned above, the stripper blade 292 may be lowered onto the container, and, if the stripper blade 292 is about ½ inch to 1.25 inches in thickness, the stripper blade 292 may be lowered a corresponding amount. By one approach, the stripper blade 292 is lowered about 3.4 inch. The extension block 303 may have a shoulder 307 that fits just inside the neck of the container when the stripper blade 292 is lowered onto the top of the container.

Once the stripper blade, such as blade 292 is in position on top of the container, the container and the stripper blade are lowered together from the remainder of the cutting and depositing apparatus 10 such that the divider is removed from the interior of the container. Thus, in one configuration, the container and the stripper blade may be lowered about the same height as the divider, or possibly a slightly larger amount. In this manner, the stripper blade retains the cucumber sections within the container and the divider is removed from within the container. The lowering of the stripper blade and the container together is in addition to the about ½ inch to about 1.25 inches lowering that the stripper blade 292 may do prior to when the stripper blade and container are lowered together to remove the divider from the interior of the container.

As the container is lowered from the remainder of the cutting and depositing apparatus 10 and the divider is moved out of the container, the friction between the cucumber sections or portions, the divider, and jar, has a tendency to pull the cucumber portions upward toward the neck of the container, which typically has a smaller diameter than the remainder of the container. However, by having the extension block 303 extend into the container, the extension block 303 prevents the cucumber portions from being pulled into the neck of the container as the container is being lowered and helps facilitate removal of the divider from the container. Indeed, when the cucumber portions move into the neck of the container, the friction increases between the divider, cucumber portions, and container such that it can become difficult to remove the divider from the container or lower the container.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

We claim:

1. A method of automated loading of cucumbers into containers, the method comprising:
    positioning a cucumber into a positioning receptacle;
    advancing the cucumber through a centering mechanism and into engagement with at least one knife to produce cucumber sections;
    advancing the cucumber sections into a first and a second chute, wherein approximately a first half of the cucumber advances into the first chute and approximately a second half of the cucumber advances into the second chute;
    moving the first chute and the second chute from a first position adjacent the at least one knife to a second position adjacent first and second containers;
    disposing a first and a second divider into interior spaces of the first and the second containers;
    aligning an unfilled divider compartment of the first and second dividers with an exit of the first and the second chute;
    advancing the cucumber sections from the first and the second chutes into first and second containers and into the unfilled divider compartment of the first and the second dividers,
    wherein at least some of the cucumber sections rotate within the first and second chutes as the cucumber sections move through the first and second chutes such that at least a portion of a cut face of the cucumber sections is positioned adjacent a container wall;
    depositing the cucumber sections advanced through the first chute into a single divider compartment of the first divider and depositing the cucumber sections advanced through the second chute into a single divider compartment of the second divider;
    rotating the first and the second dividers to align another unfilled divider compartment of the first and the second dividers with the exit of the first and the second chutes when the first and the second chutes are located in the second position adjacent the first and the second containers;
    positioning additional cucumbers into the positioning receptacle and advancing the additional cucumbers until the first and second containers are filled with the cucumber sections along the container wall and in a center portion of the container;
    positioning first and second stripper blades at first and second container openings; and
    removing the first and second dividers from the interior spaces of the first and second containers through openings in the first and second stripper blades.

2. The method of claim 1 further comprising actuating a pushing apparatus to advance the cucumbers downward and through the centering mechanism.

3. The method of claim 2 further comprising longitudinally cutting the cucumber as it advances into engagement with the at least one knife.

4. The method of claim 3 wherein the at least one knife comprises a single knife that forms cucumber halves.

5. The method of claim 3 wherein the at least one knife comprises a plurality of spaced, parallel knives that form cucumber slices.

6. The method of claim 3 wherein the at least one knife comprises a plurality of radially disposed knives that form cucumber spears.

7. The method of claim 6 wherein the cucumber spears have a cut face angle between a first and a second cut face of between about 36° and about 72°.

8. The method of claim 7 wherein the cucumber is formed into six cucumber spears and three of the cucumber spears are loaded into one of the unfilled divider compartments in the first container and three of the cucumber spears are loaded into one of the unfilled divider compartments in the second container.

9. The method of claim 8 wherein the cut face angle of two of the three cucumber spears loaded into the one of the unfilled divider compartments is between about 64° to about 72° and the cut face angle of the other of the three cucumber spears is between about 36° and 52°.

10. The method of claim 9 wherein the first and second containers are filled with fifteen cucumber spears from a portion of five cucumbers.

11. The method of claim 1 further comprising elevating the first and second containers such that the first and second dividers advance through the first and second container openings and the first and second dividers are disposed within the interior spaces of the first and second containers.

12. The method of claim 11 further comprising lowering the first and the second dividers through the first and second container openings of the first and second containers.

13. The method of claim 1 further comprising filling the containers with a dry seasoning prior to the depositing the cucumber sections into the containers.

14. The method of claim 1 further comprising filling the containers with a brine solution subsequent to depositing the cucumber sections into the containers.

15. The method of claim 1 further comprising cutting the cucumbers to a pre-determined length.

16. The method of claim 1 further comprising selecting the cucumbers such that the cucumbers positioned into the positioning receptacle having a pre-determined diameter.

17. A method of producing pickles compromising:
dividing cucumbers into elongated sections;
packing said sections into jars;
introducing brine into the said jars; and
sealing said jars;
wherein packing said sections into jars comprises temporarily dividing the interior of each jar into sectors by inserting a divider that is movable relative to the jar, each sector being defined by an arcuate portion of the periphery of the jar and a pair of walls extending inward therefrom; orienting said cucumber sections into groups; placing a respective one of said groups into each of said sectors; and removing the divider from the jar while retaining the groups of cucumber sections in the jar so that the step of packing said sections into jars is completed without manual insertion of pickle sections.

* * * * *

UNITED STATES PATENT AND TRADEMARK OFFICE
CERTIFICATE OF CORRECTION

| | | |
|---|---|---|
| PATENT NO. | : 8,663,723 B2 | Page 1 of 1 |
| APPLICATION NO. | : 13/737346 | |
| DATED | : March 4, 2014 | |
| INVENTOR(S) | : Borkiewicz et al. | |

It is certified that error appears in the above-identified patent and that said Letters Patent is hereby corrected as shown below:

In the Claims

In Column 21, Line 1, in Claim 17, delete "compromising:" and insert -- comprising: --.

Signed and Sealed this
Twenty-fourth Day of March, 2015

Michelle K. Lee
*Director of the United States Patent and Trademark Office*